(12) United States Patent
Ito et al.

(10) Patent No.: US 7,821,738 B2
(45) Date of Patent: Oct. 26, 2010

(54) MAGNETIC RECORDING MEDIUM, STAMPER RECORDING/REPRODUCING APPARATUS AND METHOD OF MEASURING A PARAMETER

(75) Inventors: Kuniyasu Ito, Tokyo (JP); Makoto Moriya, Tokyo (JP); Kazuya Shimakawa, Tokyo (JP)

(73) Assignee: TDK Corporation, Tokyo (JP)

( * ) Notice: Subject to any disclaimer, the term of this patent is extended or adjusted under 35 U.S.C. 154(b) by 315 days.

(21) Appl. No.: 11/557,533

(22) Filed: Nov. 8, 2006

(65) Prior Publication Data

US 2007/0139804 A1      Jun. 21, 2007

(30) Foreign Application Priority Data

Dec. 20, 2005    (JP)    ............... 2005-365668

(51) Int. Cl.
*G11B 5/82* (2006.01)
*G11B 5/86* (2006.01)
*G11B 5/09* (2006.01)
*G11B 5/596* (2006.01)

(52) U.S. Cl. .................... 360/135; 360/16; 360/48; 360/77.08

(58) Field of Classification Search ............... None
See application file for complete search history.

(56) References Cited

U.S. PATENT DOCUMENTS

| 6,829,201 | B2* | 12/2004 | Nishikawa et al. | ....... 369/13.38 |
|---|---|---|---|---|
| 2002/0051307 | A1* | 5/2002 | Nishikawa et al. | ............. 360/17 |
| 2005/0117253 | A1* | 6/2005 | Moriya et al. | ............... 360/135 |
| 2005/0128632 | A1 | 6/2005 | Nakamura et al. | |
| 2005/0233176 | A1 | 10/2005 | Takai et al. | |
| 2006/0077880 | A1 | 4/2006 | Moriya et al. | |
| 2006/0198042 | A1 | 9/2006 | Kaizu et al. | |
| 2006/0198052 | A1* | 9/2006 | Soeno et al. | ................ 360/132 |
| 2006/0203368 | A1 | 9/2006 | Kaizu et al. | |
| 2006/0203386 | A1* | 9/2006 | Soeno et al. | ................ 360/135 |
| 2006/0250718 | A1 | 11/2006 | Nakamura et al. | |

FOREIGN PATENT DOCUMENTS

JP      2005-166115      6/2005
JP      2005-166116      6/2005

OTHER PUBLICATIONS

U.S. Appl. No. 11/557,571 to Moriya et al., filed Nov. 8, 2006.
U.S. Appl. No. 11/536,954 to Hattori et al., filed Sep. 29, 2006.
U.S. Appl. No. 11/536,846 to Hattori et al., filed Sep. 29, 2006.
English language Abstract of JP 2005-166115.
English language Abstract of JP 2005-166116.

* cited by examiner

*Primary Examiner*—Daniell L Negrón
(74) *Attorney, Agent, or Firm*—Greenblum & Bernstein, P.L.C.

(57) ABSTRACT

Data track pattern regions, in which data track patterns are formed by concave/convex patterns, and servo pattern regions, in which servo patterns are formed by concave/convex patterns, are provided on a magnetic recording medium so as to be alternately disposed in a circumferential direction. At least one predetermined region that differs to the data track pattern regions is provided between two servo pattern regions that are adjacent in a circumferential direction. A concave/convex pattern including a plurality of first convex parts formed continuously in a radial direction is formed in each predetermined region.

13 Claims, 8 Drawing Sheets

MAGNETIC RECORDING MEDIUM, STAMPER RECORDING/REPRODUCING APPARATUS AND METHOD OF MEASURING A PARAMETER

BACKGROUND OF THE INVENTION

1. Field of the Invention

The present invention relates to a magnetic recording medium on which a data track pattern and a servo pattern are formed by concave/convex patterns and to a stamper on which a stamper-side concave/convex pattern corresponding to the concave/convex patterns of the magnetic recording medium is formed. The present invention also relates to a recording/reproducing apparatus including a magnetic recording medium, a recording head, and a reproducing head and to a method of measuring a parameter that measures a predetermined parameter for at least one of a recording head and a reproducing head installed in a recording/reproducing apparatus.

2. Description of the Related Art

As one example of a recording/reproducing apparatus that is equipped with this type of magnetic recording medium and can measure a predetermined parameter for at least one of a recording head and a reproducing head, Japanese Laid-Open Patent Publication No. 2005-166115 discloses a hard disk drive apparatus (a "magnetic recording apparatus") with an offset measuring function. This hard disk drive apparatus includes a discrete track-type hard disk (magnetic recording medium) where non-magnetic regions are formed between tracks in discrete regions, a composite magnetic head including a recording head and a reproducing head, a driving mechanism that moves the magnetic head between the inner periphery and the outer periphery of the hard disk, and a control unit that carries out overall control of the hard disk drive apparatus. The hard disk described above is provided with offset measurement regions that are used for carrying out an offset measuring process and are disposed between the discrete regions (data track pattern regions) for recording recorded data and servo regions (servo pattern regions) in which servo data is recorded. The offset measurement regions are entirely constructed of a magnetic material without non-magnetic regions being formed therein.

During an offset measuring process carried out by this hard disk drive apparatus, offset measurement signals (measurement patterns, hereinafter also referred to simply as "measurement signals") are written in offset measurement regions on the hard disk in a state where data has not been recorded on the hard disk and the offset measurement regions have been initialized. More specifically, in a state where the reproducing head is being made on-track to an innermost track, for example, measurement signals are written in the offset measurement regions using the recording head. When doing so, in a hard disk drive apparatus of this type, when the magnetic head has been moved toward the inner periphery or the outer periphery of the hard disk, a line that joins the center in the width direction of the recording head and the center in the width direction of the reproducing head (as one example, a line that is parallel to the direction in which the arm extends) is intersected by the center line of a track (i.e., a skew angle is produced). Accordingly, when the reproducing head is being made on-track to a track (i.e., when the center in the width direction of the reproducing head has been aligned with the center in the width direction of a track), the center in the width direction of the recording head will be positioned away from the center of the track, or in other words, the recording head will be made "off-track". This means that the measurement signals will be recorded at positions that are separated from the center line of the track by a distance corresponding to the extent to which the recording head is made off-track.

Next, by reading the measurement signals using the reproducing head, the center in the radial direction of the regions in which the measurement signals were written, or in other words, a position that matches the center in the width direction of the recording head when the measurement signals were written is specified. More specifically, by moving the reproducing head in the radial direction of the hard disk by increments of a predetermined amount, the measurement signals are read from the offset measurement regions. Here, when the center in the width direction (i.e., the radial direction) of the reproducing head is positioned off the center in the radial direction of the regions where the measurement signals are written toward the inner periphery or the outer periphery, the amplitude of the reproducing signal for the read measurement signal decreases. On the other hand, when the center in the width direction (i.e., the radial direction) of the reproducing head matches the center in the radial direction of the regions where the measurement signals were written, the amplitude of the reproducing signal for the read measurement signal reaches its maximum value. Accordingly, the control unit specifies the center position of the reproducing head at a point where the amplitude of the reproducing signal for the measurement signals reaches its maximum value as the center in the radial direction of the regions in which the measurement signals were written and sets the distance between the specified center and the center of the reproducing head during the writing of the measurement signals (i.e., the center of the track) as the offset of the recording head with respect to the reproducing head, thereby completing the measurement process.

SUMMARY OF THE INVENTION

However, by investigating the hard disk (magnetic recording medium) installed in the conventional hard disk drive apparatus (recording/reproducing apparatus), the present inventors found the following problem. That is, the conventional recording/reproducing apparatus is constructed so that offset measurement regions are provided between the discrete regions (the data track pattern regions) and the servo regions (the servo pattern regions) and measurement signals for measuring the offset are written in the offset measurement regions. To make writing of the measurement signals possible, the offset measurement regions are formed entirely of magnetic material (i.e., convex parts) with no non-magnetic regions (i.e., concave parts) being formed therein. This means that when the magnetic head has been disposed over the magnetic recording medium, there is a large difference in the area of the convex parts situated below the slider of the magnetic head between when the magnetic head is positioned above a data track pattern region or a servo pattern region and when the magnetic head is positioned above an offset measurement region. As a result, with the conventional magnetic recording medium, there is a problem in that the flying height of the magnetic head above the magnetic recording medium fluctuates due to the difference in the amount of air present between the slider and the magnetic recording medium between when the magnetic head is positioned above a data track pattern region or a servo pattern region and when the magnetic head is positioned above an offset measurement region. As a result, in the conventional recording/reproducing apparatus, it is difficult to carry out stable recording and reproducing, which causes a fall in the measurement accuracy of offsets and the like.

To solve the problem described above, a technique that makes the surface of the magnetic recording medium smooth by filling the concave parts in the concave/convex patterns with a non-magnetic material has been proposed (see for example Japanese Laid-Open Patent Publication No. H09-97419). When manufacturing a magnetic recording medium according to such technique, as one example, non-magnetic material is sputtered so as to cover the entire concave/convex pattern formation surface and then the layer of non-magnetic material (hereinafter also referred to as the "non-magnetic layer") is dry etched until the protruding end surfaces (i.e., upper surfaces) of the convex parts that construct the servo patterns, the data recording tracks, and the like are exposed, thereby smoothing the surface of the magnetic recording medium. However, when the concave parts in the concave/convex patterns of the magnetic recording medium described earlier are filled with non-magnetic material according to this method, during the dry etching process carried out on the non-magnetic layer, there is the risk of a large amount of non-magnetic material (hereinafter, non-magnetic material remaining on convex parts is referred to as "residue") remaining on convex parts with wide protruding end surfaces (i.e., the convex parts formed in the offset measurement regions), resulting in the offset measurement regions becoming covered by thick residue.

More specifically, the present inventors discovered that when the convex parts are exposed by dry etching a non-magnetic material layer formed so as to cover the entire concave/convex pattern formation surface, the wider the protruding end surfaces of the convex parts situated below the non-magnetic layer (i.e., the longer the lengths both in the circumferential direction and the length in the radial direction), the slower the etching of the non-magnetic layer proceeds. Accordingly, if the dry etching process is completed at a point where protruding end surfaces of the convex parts become exposed from the non-magnetic layer in the data track pattern regions where convex parts with comparatively narrow protruding end surfaces (i.e., convex parts that are comparatively short in the radial direction) are formed and in the servo pattern regions where convex parts with comparatively narrow protruding end surfaces (i.e., convex parts that are comparatively short in the circumferential direction) are formed, thick residue will be produced in the offset measurement regions where convex parts with wide protruding end surfaces (i.e., convex parts that are long in the radial direction and are also comparatively long in the circumferential direction) are formed. This causes deterioration in the surface smoothness of the magnetic disk. On the other hand, if the dry etching process is extended until the residue on the convex parts in the offset measurement regions is completely removed, not only the non-magnetic layer but also a magnetic layer (i.e., the convex parts themselves) will be etched in the data track pattern regions and the servo pattern regions where convex parts with comparatively narrow protruding end surfaces are formed. This means that if the dry etching process is extended until the residue on the convex parts in the offset measurement regions is completely removed, the convex parts in the concave/convex patterns in the data track pattern regions and the servo pattern regions will be excessively etched, resulting in the risk of difficulty in reading magnetic signals.

The present invention was conceived to solve the problem described above and it is a principal object of the present invention to provide a magnetic recording medium that makes the flying height of a head uniform across the entire medium without causing deterioration in surface smoothness or read errors for magnetic signals, a stamper for manufacturing the magnetic recording medium, a recording/reproducing apparatus that is equipped with the magnetic recording medium and can measure predetermined parameters for at least one of a recording head and a reproducing head with high precision, and a method of measuring a parameter.

To achieve the stated object, the present invention provides a magnetic recording medium on which data track pattern regions, in which data track patterns are formed by concave/convex patterns, and servo pattern regions, in which servo patterns are formed by concave/convex patterns, are provided so as to be alternately disposed in a circumferential direction and on which at least one predetermined region that differs to the data track pattern regions is provided, each predetermined region being disposed between two servo pattern regions out of the servo pattern regions that are adjacent in the circumferential direction, wherein a concave/convex pattern including a plurality of first convex parts formed continuously in a radial direction is formed in each predetermined region. Note that the expression "formed continuously in a radial direction" in this specification is not limited to a state of being formed continuously in a direction perpendicular to the circumferential direction and also includes a state of being formed continuously in a direction that intersects the radial direction at an acute angle.

According to this magnetic recording medium, by providing at least one predetermined region that differs to data track pattern regions and is disposed between two servo pattern regions that are adjacent in a circumferential direction and forming a concave/convex pattern including a plurality of first convex parts formed continuously in a radial direction in each predetermined region, unlike a conventional magnetic recording medium where the entire offset measurement regions are constructed of convex parts, the length in the circumferential direction of the first convex parts in each predetermined region is sufficiently short, and therefore it is possible to avoid a situation where a large difference is produced in the flying height of the head between the data track pattern regions, the servo pattern regions, and each predetermined region. Also, even if the concave parts in the concave/convex pattern are filled with non-magnetic material, since no excessively wide convex parts are present in each predetermined region, it will be possible to expose the protruding end surfaces (the upper surfaces) of the first convex parts from the non-magnetic material without producing thick residue on the first convex parts inside each predetermined region. As a result, it is possible to provide a magnetic recording medium with favorable surface smoothness. Also, by installing the magnetic recording medium in a recording/reproducing apparatus, it is possible to provide a recording/reproducing apparatus that can measure predetermined parameters for at least one of the recording head and the reproducing head without fluctuations in the flying height of the head or deterioration in the surface smoothness.

On a magnetic recording medium according to the present invention, each predetermined region may be disposed between a data track pattern region out of the data track pattern regions and a servo pattern region out of the servo pattern regions that is adjacent to the data track pattern region out of the data track pattern regions in the circumferential direction and the concave/convex patterns may be formed so that the data track pattern regions, the servo pattern regions, and each predetermined region are respectively continuous in the circumferential direction.

According to this magnetic recording medium, since each predetermined region is not formed inside the data track pattern regions or inside the servo pattern regions, the data track pattern regions and the servo pattern regions can be formed continuously in the circumferential direction without such regions being interrupted by the predetermined region.

In addition, on a magnetic recording medium according to the present invention, each predetermined region may be set on at least one of an inner periphery side and an outer periphery side relative to the data track pattern regions in the radial direction.

According to this magnetic recording medium, it is possible to form the data track pattern regions and the servo pattern regions continuously in the radial direction without such regions being interrupted by the predetermined region.

On a magnetic recording medium according to the present invention, the first convex parts may be formed so that a diameter of an inscribed circle with a largest diameter out of inscribed circles on protruding end surfaces of the first convex parts is no greater than a diameter of an inscribed circle with a largest diameter out of inscribed circles on protruding end surfaces of second convex parts formed inside the data track pattern regions and inscribed circles on protruding end surfaces of third convex parts formed inside the servo pattern regions.

According to this magnetic recording medium, since each predetermined region does not include first convex parts with wide protruding end surfaces that can have inscribed circles with a diameter that exceeds the diameter of the inscribed circles with the largest diameters out of the inscribed circles on the protruding end surfaces of the second convex parts in the data track pattern regions and the third convex parts in the servo track pattern regions, during the etching of a layer of non-magnetic material formed so as to cover the concave/convex patterns inside each predetermined region, it is possible to reliably avoid a state where thick residue is produced inside each predetermined region. This means that it is possible to provide a magnetic recording medium that has favorable surface smoothness and from which recorded data, servo data, and the like can be reliably read.

The present invention also provides a stamper on which is formed a stamper-side concave/convex pattern corresponding to the concave/convex patterns on any of the magnetic recording media described above.

According to this stamper, since a stamper side concave/convex pattern is formed corresponding to the concave/convex patterns of any of the magnetic recording media described above, during an imprinting process carried out on a resist layer (a resin layer) formed on a preform for manufacturing a magnetic recording medium, for example, it is possible to form a concave/convex pattern where no convex parts with wide protruding end surfaces are present in each predetermined region. Accordingly, by carrying out an etching process on the preform using the concave/convex pattern formed by the imprinting or a concave/convex pattern where the positional relationship between the convexes and the concaves matches such concave/convex pattern as a mask pattern, it is possible to form concave/convex patterns where no convex parts with wide protruding end surfaces are present in each predetermined region or the like. Accordingly, it is possible to manufacture a magnetic recording medium so that the flying height of the head is substantially uniform between the data track pattern regions, the servo pattern regions, and each predetermined region. Even with a construction where the concave parts of the concave/convex patterns are filled with a non-magnetic material, during etching of the layer of the non-magnetic material formed so as to cover the concave/convex patterns formed using the stamper, it will be possible to avoid a situation where thick residue is produced on the first convex parts in each predetermined region. This means that it is possible to manufacture a magnetic recording medium that has favorable surface smoothness and from which recorded data, servo data, and the like can be reliably read.

A recording/reproducing apparatus according to the present invention includes: a magnetic recording medium on which data track pattern regions, in which data track patterns are formed by concave/convex patterns, servo pattern regions, in which servo patterns are formed by concave/convex patterns, and at least one predetermined region, which differs to the data track pattern regions and the servo pattern regions, are provided; a recording head that writes signals on the magnetic recording medium; a reproducing head that reads signals written on the magnetic recording medium; and a control unit that controls writing of the signals by the recording head and reading of the signals by the reproducing head and measures a predetermined parameter for at least one of the recording head and the reproducing head by writing and reading measurement signals on the magnetic recording medium, wherein a concave/convex pattern including a plurality of first convex parts formed continuously in a radial direction is formed in each predetermined region of the magnetic recording medium, and when measuring the predetermined parameter, the control unit writes the measurement signals using the recording head on the first convex parts, reads the measurement signals using the reproducing head, and measures the predetermined parameter based on a result of reading the measurement signals.

A method of measuring a parameter according to the present invention is applied to a recording/reproducing apparatus that includes: a magnetic recording medium on which data track pattern regions, in which data track patterns are formed by concave/convex patterns, servo pattern regions, in which servo patterns are formed by concave/convex patterns, and at least one predetermined region, which differs to the data track pattern regions and the servo pattern regions, are provided and on which a concave/convex pattern including a plurality of first convex parts formed continuously in a radial direction is formed in each predetermined region; a recording head that writes signals on the magnetic recording medium; and a reproducing head that reads signals written on the magnetic recording medium, the method comprising writing and reading measurement signals on the magnetic recording medium, thereby measuring a predetermined parameter for at least one of the recording head and the reproducing head, wherein the writing the measurement signals is performed by using the recording head on the first convex parts formed in each predetermined region, the reading the measurement signals is performed by using the reproducing head, and the measuring the predetermined parameter is performed based on a result of the reading the measurement signals.

According to this recording/reproducing apparatus and method of measuring a parameter, measurement signals are written using the recording head onto the first convex parts inside each predetermined region that includes a concave/convex pattern with a plurality of first convex parts that are formed continuously in the radial direction, the measurement signals are read using the reproducing head, and the predetermined parameter is measured based on the read results. By doing so, the flying height of the head can be kept substantially uniform across the entire magnetic recording medium and as a result, it is possible to measure the predetermined parameter with high precision without causing recording errors or reading errors for the measurement signals.

In a recording/reproducing apparatus according to the present invention, as measurement of the predetermined parameter, the control unit may measure a distance in the radial direction between a center of a length of the recording head in a direction corresponding to the radial direction of the magnetic recording medium and a center of a length of the reproducing head in the direction corresponding to the radial direction.

According to this recording/reproducing apparatus, it is possible to properly measure the distance described above (i.e., the offset) for the entire range from the inner periphery to the outer periphery of the magnetic recording medium in a recording/reproducing apparatus where the relative positional relationship between the recording head and the reproducing head differs due to manufacturing errors and differences between individual components. As a result, it is possible to make the recording head and the reproducing head reliably on-track to each track on the magnetic recording medium.

In a recording/reproducing apparatus according to the present invention, as measurement of the predetermined parameter, the control unit may measure at least one of a magnetic write width of the recording head and a magnetic read width of the reproducing head.

According to this recording/reproducing apparatus, it is possible to properly measure the magnetic write width and the magnetic read width in a state where the magnetic recording medium actually installed in the recording/reproducing apparatus has been combined with the recording head and the reproducing head. By doing so, various control parameters for tracking servo control can be finely adjusted individually for each actual recording/reproducing apparatus based on the measured magnetic write width and the magnetic read width. It is also possible to finely adjust the write current based on the measured magnetic write width and to adjust the gain based on the measured magnetic read width. Accordingly, it is possible to provide a recording/reproducing apparatus that can reliably record data and can reliably read the recorded data and the servo data across the entire range from the inner periphery to the outer periphery of the magnetic recording medium.

It should be noted that the disclosure of the present invention relates to the content of Japanese Patent Application 2005-365668 that was filed on Dec. 20, 2005, the entire content of which is herein incorporated by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Preferred embodiments of a magnetic recording medium, a stamper, a recording/reproducing apparatus and a method of measuring a parameter according to the present invention will now be described with reference to the attached drawings.

First, the construction of the recording/reproducing apparatus according to the present invention will be described with reference to the drawings.

Figure 1:
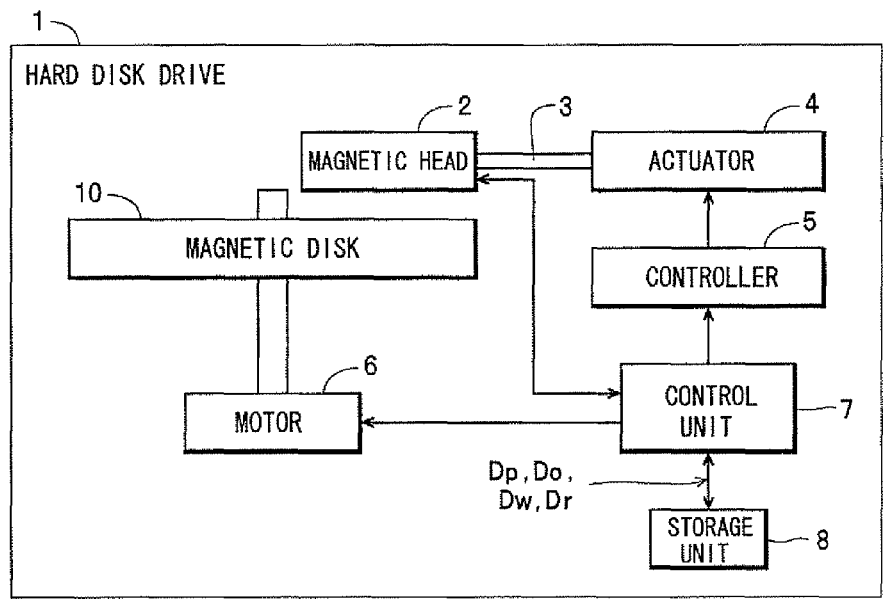
FIG. 1 is a block diagram showing the construction of a hard disk drive.
Figure 3:
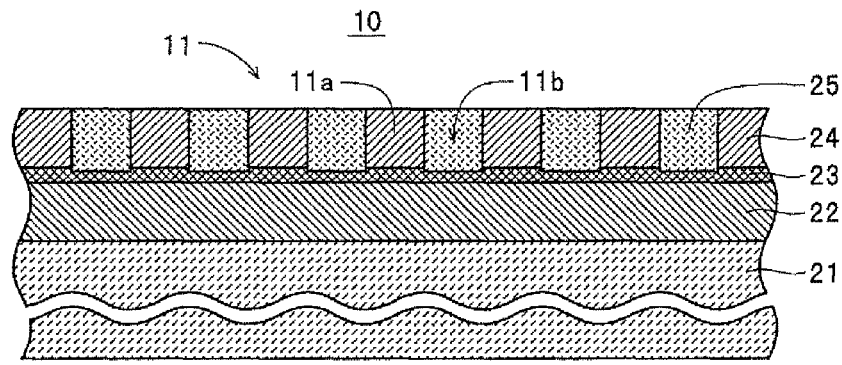
FIG. 3 is a cross-sectional view of the magnetic disk.

The hard disk drive 1 shown in FIG. 1 is one example of a recording/reproducing apparatus according to the present invention and includes a magnetic head 2, an arm 3, an actuator 4, a controller 5, a motor 6, a control unit 7, a storage unit 8, and a magnetic disk 10. The magnetic disk 10 is a discrete track-type magnetic disk (patterned medium) on which data can be recorded by perpendicular recording and is disposed together with the magnetic head 2 and the like inside the housing of the hard disk drive 1. The magnetic disk 10 is one example of a "magnetic recording medium" according to the present invention and as shown in FIG. 3 is constructed so that a soft magnetic layer 22, an intermediate layer 23, and a magnetic layer 24 are formed in the mentioned order on the substrate 21. Here, the magnetic layer 24 constructs concave/convex patterns 11 in which a plurality of convex parts 11a (magnetic regions), at least protruding end parts of which are formed of magnetic material, and a plurality of concave parts 11b (non-magnetic regions) located between the convex parts 11a are formed. The concave parts 11b are filled with a non-magnetic material 25 such as $SiO_2$ to make the surface of the magnetic disk 10 smooth. In addition, a protective layer (DLC film: not shown) of diamond-like carbon (DLC) or the like is formed on the surfaces of the non-magnetic material 25 that fills the concave parts 11b and the magnetic layer 24 (i.e., the convex parts 11a). A lubricant (as one example, a Fomblin lubricant: not shown) is also applied onto the surface of the protective layer to protect both the magnetic head 2 and the magnetic disk 10 from damage.

As one example, the substrate 21 is formed in a circular-plate shape by polishing the surface of a glass plate. It should be noted that in place of a glass substrate, it is possible to use a substrate formed using various types of non-magnetic material such as aluminum or ceramics. The soft magnetic layer 22 is formed as a thin film by sputtering a soft magnetic material such as CoZrNb alloy. The intermediate layer 23 functions as an underlayer for forming the magnetic layer 24 and is formed as a thin film by sputtering an intermediate layer forming material such as Cr or a non-magnetic CoCr alloy. As described earlier, the magnetic layer 24 constructs the concave/convex patterns 11 (as shown in FIG. 5, concave/convex patterns 11t for the data track patterns, concave/convex patterns 11s for the servo patterns, and concave/convex patterns 11z used in a parameter measuring process). The magnetic layer 24 is formed by sputtering a CoCrPt alloy, for example. The concave parts 11b are formed by forming a predetermined mask pattern using a stamper 30 shown in FIG. 4 on the magnetic layer 24 and carrying out an etching process using the mask pattern.

Figure 2:
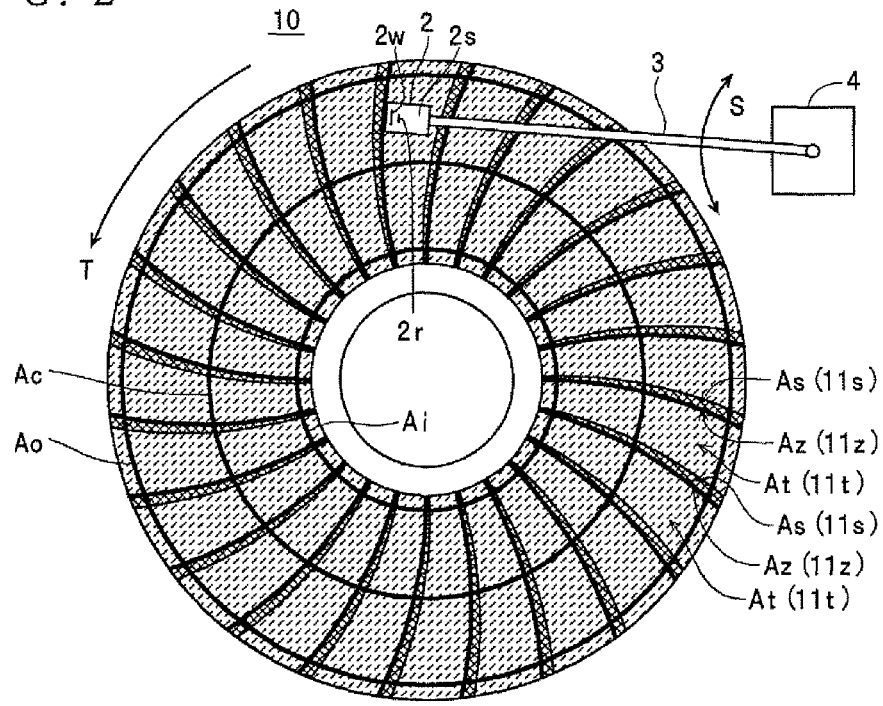
FIG. 2 is a plan view of a magnetic disk.

Here, as shown in FIG. 2, on the magnetic disk 10, servo pattern regions As are provided between the respective data track pattern regions At, and the data track pattern regions At and the servo pattern regions As are provided so as to be alternately disposed in the circumferential direction (the direction of rotation: the direction of the arrow T in FIG. 2) of the magnetic disk 10. A measurement region Az that corresponds to at least one "predetermined region" for the present invention is disposed between each pair of servo pattern regions As that are adjacent in the circumferential direction. More specifically, as shown in FIG. 5, as one example, the measurement region Az is disposed between an data track pattern region At (in this example, the data track pattern region At on the right in FIG. 5) and a servo pattern region As (in this example, the servo pattern region As on the left in FIG. 5) that is adjacent to the data track pattern region At in the circumferential direction as a region that differs to the data track pattern region At and the servo pattern region As. The data track pattern regions At, the servo pattern regions As, and the measurement regions Az are provided so as to be continuous in the circumferential direction. In each measurement region Az, a concave/convex pattern 11z is formed with a plurality of concave parts 11b formed continuously in the radial direction of the magnetic disk 10 in long belt-like shapes elongated in the radial direction and a plurality of convex parts 11a formed continuously in the radial direction in long belt-like shapes elongated in the radial direction. Note that in FIG. 5 and in FIGS. 8 to 14 and 16 described later, the formation positions of the convex parts 11a are obliquely shaded. Also, in FIGS. 5 and 16, for ease of understanding the present invention, a state where there is no skew angle θ that is produced in the inner periphery Ai and the outer periphery Ao of the magnetic disk 10 is schematically shown. The convex parts 11a formed in each measurement region Az correspond to "first convex parts" for the present invention and at least protruding end parts thereof are formed of magnetic material (the magnetic layer 24).

The length in the radial direction of the convex parts 11a in each measurement region Az is set so as to be substantially equal to the length from the inner periphery Ai to the outer periphery Ao of the magnetic disk 10. Note however that the length in the radial direction of the convex parts 11a formed in each measurement region Az is not limited to the example described above, and the convex parts 11a on which the measurement signals are written as described later as first convex parts for the present invention should preferably have a length in the radial direction of at least twenty times the track pitch so that a measurement process for an offset OW and a measurement process for a magnetic write width MWW and a magnetic read width MRW can be carried out reliably. The length in the circumferential direction of the convex parts 11a formed in each measurement region Az is set so as to gradually increase from the inner periphery Ai to the outer periphery Ao. Note that on the magnetic disk 10, around ten to thirty (as one example, thirty) convex parts 11a are formed in each measurement region Az. In addition, the concave parts 11b formed in each measurement region Az are formed so that the length thereof in the radial direction is set substantially equal to the length in the radial direction of the convex parts 11a and the length thereof in the circumferential direction is substantially equal to the length in the circumferential direction of the convex parts 11a at positions with the same radius.

On the other hand, as shown in FIG. 5, in the data track pattern regions At, concave/convex patterns 11 (the concave/convex patterns 11t) with a plurality of convex parts 11a that construct a large number of concentric data recording tracks produced by dividing the region with a predetermined arrangement pitch and a plurality of concave parts 11b that construct guard band parts are formed. The convex parts 11a formed in each data track pattern region At correspond to "second convex parts" for the present invention, at least protruding end parts of the convex parts 11a are formed of magnetic material (i.e., the magnetic layer 24), and the convex parts 11a are continuously formed in the circumferential direction (the direction of rotation) of the magnetic disk 10 in long belt-like shapes elongated in the circumferential direction. As one example, the convex parts 11a and the concave parts 11b inside each data track pattern region At are set so that the lengths thereof in the radial direction are substantially equal and are formed so that the formation pitch of the convex parts 11a (that is, the track pitch of the data recording tracks) and the lengths in the radial direction (that is the length in the radial direction of the data recording tracks and the guard band parts) are substantially equal across the entire range from the inner periphery Ai to the outer periphery Ao of the magnetic disk 10.

In each servo pattern region As, a concave/convex pattern 11s including a plurality of convex parts 11a and a plurality of concave parts 11b that construct a variety of servo patterns for tracking servo control are formed. A preamble pattern region Ap in which a preamble pattern is formed by the concave/convex pattern 11s, an address pattern region (not shown) in which an address pattern is formed by the concave/convex pattern 11s, and a burst pattern region Ab in which burst patterns are formed by the concave/convex pattern 11s are provided in each servo pattern region As. In addition, four regions Ab1 to Ab4 corresponding to signal regions of the burst patterns are also provided inside each burst pattern region Ab (only the regions Ab1, Ab4 are shown in FIG. 5). In the hard disk drive 1, servo signals for tracking servo control are read from the servo pattern regions As in a state where the magnetic disk 10 is rotated at a constant angular velocity. For this reason, as shown in FIG. 2, on the magnetic disk 10, the length in the circumferential direction of the servo pattern regions As is set so as to gradually increase from the inner periphery Ai to the outer periphery Ao, and together with this, the lengths in the circumferential direction of the various regions such as the preamble pattern regions Ap, the address pattern regions, and the burst pattern regions Ab are set so as to gradually increase from the inner periphery Ai to the outer periphery Ao.

At least protruding end parts of the convex parts 11a formed in the preamble pattern region Ap in each servo pattern region As are formed of magnetic material (i.e., the magnetic layer 24), with such convex parts 11a being continuously formed in the radial direction of the magnetic disk 10 in long belt-like shapes elongated in the radial direction. In the address pattern region in each servo pattern region As, like the convex parts 11a formed in the preamble pattern region Ap described above, at least the protruding end parts of the convex parts 11a (not shown) are formed of magnetic material (i.e., the magnetic layer 24). The convex parts 11a formed in the regions Ab1 to Ab4 of the burst pattern region Ab in each servo pattern region As construct unitary burst regions of each burst pattern. At least protruding end parts of these convex parts 11a are formed of the magnetic material (i.e., the magnetic layer 24) and as one example, the convex parts 11a are formed so that the length thereof in the radial direction corresponds to the track pitch and the length thereof in the circumferential direction is substantially equal to the length in the circumferential direction of the convex parts 11a in the preamble pattern region Ap at positions with the same radius. On the magnetic disk 10, the convex parts 11a formed in each servo pattern region As correspond to "third convex parts" for the present invention.

As shown in FIG. 5, each convex part 11a in the measurement regions Az described above is formed so that the diameter of an inscribed circle Qz that touches both ends in the circumferential direction of the protruding end surface of the convex part 11a is no greater than the diameter of the largest inscribed circle out of the inscribed circles on the protruding end surfaces of the convex parts 11a formed in the data track pattern regions At and the servo pattern regions As (as one example, so that the diameter of the inscribed circle Qz is equal to the diameter of the inscribed circle with the largest diameter) More specifically, in the data track pattern regions At, the concave/convex patterns 11t are formed so that the length in the radial direction of the convex parts 11a is equal from the inner periphery Ai to the outer periphery Ao of the magnetic disk 10. Accordingly, an inscribed circle Qt on a protruding end surface of any convex part 11a out of the convex parts 11a from the inner periphery Ai to the outer periphery Ao of a data track pattern region At will be the inscribed circle with the largest diameter out of the inscribed circles on the protruding end surfaces of the convex parts 11a inside the data track pattern region At.

In the preamble pattern regions Ap and the burst pattern regions Ab of the servo pattern regions As, the concave/convex patterns 11s are formed so that the length in the circumferential direction of the convex parts 11a increases from the inner periphery Ai to the outer periphery Ao of the magnetic disk 10. Accordingly, on the magnetic disk 10, for the convex parts 11a in the preamble pattern regions Ap, an inscribed circle Qp on a protruding end surface on the outer periphery Ao side will be the inscribed circle with the largest diameter in the preamble pattern regions Ap and an inscribed circle Qb on a protruding end surface of a convex part 11a on the outer periphery Ao side of a burst pattern region Ab will be the inscribed circle with the largest diameter in the burst pattern regions Ab. Also, on the magnetic disk 10, the concave/convex patterns 11s are formed so that the length in the circumferential direction of the convex parts 11a inside the burst pattern regions Ab is equal to the length in the circumferential direction of the convex parts 11a in the preamble pattern regions Ap at positions with the same radius, for example. Accordingly, the inscribed circle Qp with the largest diameter out of the convex parts 11a inside the preamble pattern regions Ap and the inscribed circle Qb with the largest diameter inside the burst pattern regions Ab have equal diameters. Here, on the magnetic disk 10, as one example, the diameters of the inscribed circles Qp, Qb are the largest diameters out of the inscribed circles on the protruding end surfaces of the convex parts 11a inside the servo pattern regions As. Note that when convex parts 11a whose length in the circumferential direction is longer than the length of the convex parts 11a inside the preamble pattern regions Ap are formed inside the sector address pattern regions (not shown) out of the address pattern regions, for example, inscribed circles on the protruding end surfaces on the outer periphery side of convex parts 11a that are long in the circumferential direction will have a larger diameter than the diameter of the inscribed circles Qp, Qb and such inscribed circles (not shown) will be the inscribed circles with the largest diameter in the servo pattern regions As. In the following description, for ease of understanding the present invention, as described above, the inscribed circles Qp, Qb described above are assumed to be the inscribed circles with the largest diameter inside the servo pattern regions As.

On the other hand, as one example, the convex parts 11a inside the measurement regions Az are formed so that the length in the circumferential direction and the length in the radial direction thereof are equal to the corresponding lengths of the convex parts 11a inside the preamble pattern regions Ap of the servo pattern regions As. The diameters of the inscribed circles Qp, Qb described above are larger than the diameter of the inscribed circles Qt that have the largest diameter inside the data track pattern regions At. Accordingly, the diameter of the inscribed circles Qz with the largest diameter on the protruding end surfaces of the convex parts 11a inside the measurement regions Az (in this example, the inscribed circles on the protruding end surfaces on the outer periphery Ao side of the convex parts 11a in the measurement regions Az) is equal to the diameter of the inscribed circles Qp with the largest diameter in the preamble pattern regions Ap, or in other words equal to the diameter of the inscribed circles Qp, Qb with the largest diameter out of the inscribed circles in the data track pattern regions At and the servo pattern regions As.

Figure 6:
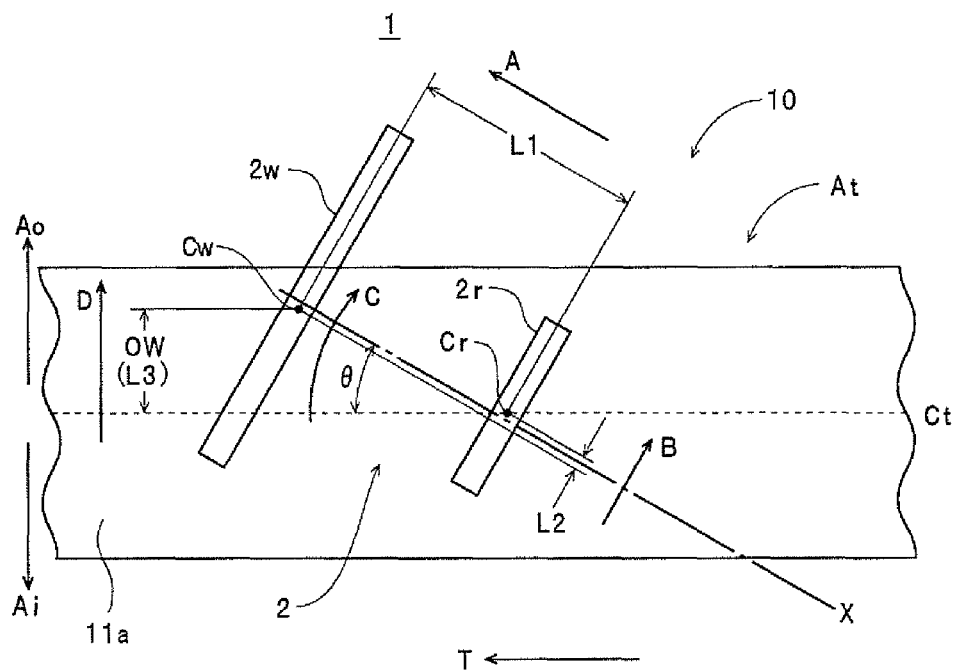
FIG. 6 is a diagram useful in explaining the sizes of a recording head and a reproducing head on a magnetic head.

On the other hand, as shown in FIG. 2, the magnetic head 2 is a composite magnetic head where a recording head 2w and a reproducing head 2r are disposed on the base surface of a slider 2s and is attached via the arm 3 to the actuator 4. On the magnetic head 2, as one example, the recording head 2w is provided on the front end side of the slider 2s and the reproducing head 2r is provided on the base end side (the arm 3 side) of the slider 2s. As shown in FIG. 6, the reproducing head 2r and the recording head 2w are formed on the magnetic head 2 so that the center Cw of the recording head 2w (i.e., the center of the length in a direction corresponding to the radial direction: a center of the length in the direction of seek operations) is a distance L1 apart from the center Cr of the reproducing head 2r (i.e., the center of the length in a direction corresponding to the radial direction: the center of the length in the direction of seek operations) Note that in FIG. 6 and in FIGS. 7, and 9 to 14 described later, for ease of understanding the present invention, the lengths of the various parts of the reproducing head 2r and the recording head 2w, the distance between the reproducing head 2r and the recording head 2w, and the like are shown differently to the actual lengths and distance. The dot-dash line X shown in FIG. 6 is a virtual line showing the direction in which the arm 3 extends, that is, the direction in which a rotation shaft of the actuator 4 is located, and in the following explanation, out of the lengths of the various parts of the magnetic head 2, lengths in a direction that is perpendicular to the dot-dash line X are referred to as "widths". Also, in the present specification, the distance L1 in the direction in which the arm 3 extends (i.e., the direction of the dot-dash line X) between the center Cr of the reproducing head 2r and the center Cw of the recording head 2w is expressed with the center Cr of the reproducing head 2r as the origin and with distances in the direction from the base end toward the front end of the arm 3 (i.e., the direction shown by the arrow A in FIG. 6) as positive distances.

The reproducing head 2r and the recording head 2w should preferably be formed so that the center Cr of the reproducing head 2r and the center Cw of the recording head 2w are not separated in the width direction of the magnetic head 2 (as one example, so that both centers Cr, Cw are located on the dot-dash line X). However, on this type of magnetic head, due to manufacturing errors, the center Cr of the reproducing head 2r and the center Cw of the recording head 2w may be separated by the distance L2 in the width direction of the magnetic head 2. Note that in the present specification, the distance L2 in the width direction between the center Cr of the reproducing head 2r and the center Cw of the recording head 2w is expressed with the center Cr of the reproducing head 2r as the origin and with distances in the direction from the inner periphery Ai toward the outer periphery Ao of the magnetic disk 10 in a state where the magnetic head 2 has been disposed over the magnetic disk 10 (i.e., the direction of the arrow B) as positive distances. On the other hand, in the hard disk drive 1 where the magnetic head 2 (the arm 3) carries out seek operations around a single rotation shaft (i.e., the actuator 4), when the magnetic head 2 is located in the inner periphery Ai or the outer periphery Ao of the magnetic disk 10 for example, as shown in FIG. 6 a skew angle θ whose value corresponds to the position of the magnetic head 2 is produced. Note that in FIG. 6 and in FIGS. 9 to 11 described later, for ease of understanding the present invention, the skew angle θ is shown differently to the actual angle. In this specification, the skew angle θ described above is expressed with angles in the direction shown by the arrow C, that is, angles on the outer periphery Ao side of a line that is parallel to the track center Ct as positive angles and angles on the inner periphery Ai side of the line as negative angles.

As described earlier, since the recording head 2w is separated from the reproducing head 2r by the distance L1, as shown in FIG. 6, in a state where the skew angle θ is produced, when the center Cr of the reproducing head 2r matches the track center Ct for example (i.e., when the reproducing head 2r is made on-track), the center Cw of the recording head 2w will be positioned away from the track center Ct (i.e., the recording head 2w will be off-track). The distance L3 by which the recording head 2w is made off-track, i.e., the distance in the radial direction between the center Cr of the reproducing head 2r and the center Cw of the recording head 2w in a state where the skew angle θ has been produced differs according to the magnitude of the skew angle θ. More specifically, the distance L3 is given by the equation "distance L3=distance L1×sin θ+distance L2×cos θ". Accordingly, to carry out tracking control to make the reproducing head 2r on-track to a desired track when servo data and recorded data are being read by the reproducing head 2r and to make the recording head 2w on-track to a desired track when data is being recorded by the recording head 2w, it is necessary to measure the distance L3 described above, that is, the offset OW (one example of a "predetermined parameter" for the present invention) between the center Cr of the reproducing head 2r and the center Cw of the recording head 2w across the entire range from the inner periphery Ai to the outer periphery Ao of the magnetic disk 10 and to store the measurement results associated with the tracks in advance as offset data Do. Note that in this specification, the offset OW between the center Cr of the reproducing head 2r and the center Cw of the recording head 2w is expressed with the center Cr of the reproducing head 2r as the origin and with distances in the direction from the inner periphery Ai to the outer periphery Ao in the radial direction of the magnetic disk 10 (i.e., the direction of the arrow D) as positive distances.

Figure 7:
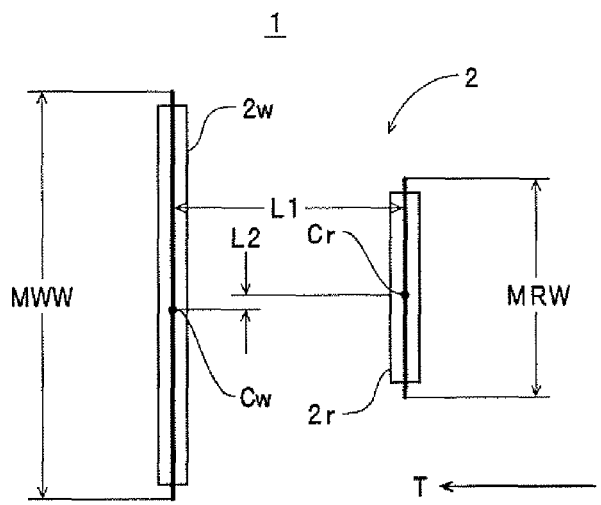
FIG. 7 is a diagram useful in explaining the magnetic write width of the recording head and the magnetic read width of the reproducing head on the magnetic head.

As shown in FIG. 7, on the magnetic head 2, the recording head 2w is formed wider than the reproducing head 2r. Accordingly, with the magnetic head 2, the magnetic write width MWW of the recording head 2w is wider than the magnetic read width MRW of the reproducing head 2r. Here, across the entire range of the magnetic disk 10, to reliably read the servo data and the recorded data using the reproducing head 2r and to reliably record data using the recording head 2w, it is preferable to measure the magnetic write width MWW and the magnetic read width MRW described above (other examples of "predetermined parameters" for the present invention), to store the measurement results as write width data Dw and read width data Dr, and to finely adjust various control parameters for tracking servo control of the actual device based on the stored data Dw and Dr. Accordingly, as described later, the hard disk drive 1 is constructed to carry out a measurement process that measures the offset OW described above across the entire range from the inner periphery Ai to the outer periphery Ao and stores offset data Do for each track in the storage unit 8 and to also carry out a measurement process that measures the magnetic write width MWW and the magnetic read width MRW in a central periphery Ac (see FIG. 2) for example and stores the write width data Dw and the read width data Dr in the storage unit 8.

On the other hand, in accordance with control by the controller 5, the actuator 4 causes the arm 3 to rotate (seek) in the direction of the arrow S shown in FIG. 2. Also, in accordance with control by the control unit 7, the controller 5 controls the actuator 4 to cause the arm 3 to rotate and thereby make the magnetic head 2 on-track to a desired track on the magnetic disk 10. In the same way, in accordance with control by the control unit 7, the motor 6 rotates the magnetic disk 10 at a constant rotational velocity, such as 5400 rpm. The control unit 7 carries out overall control of the hard disk drive 1. More specifically, the control unit 7 controls the controller 5 to drive the actuator 4 and thereby make the magnetic head 2 on-track to a desired track on the magnetic disk 10 and controls writes of data by the recording head 2w and reads of the servo data and the recorded data by the reproducing head 2r. Also, in accordance with the method of measuring a parameter according to the present invention, the control unit 7 carries out the measurement processes that measure the offset OW, the magnetic write width MWW and the magnetic read width MRW. The storage unit 8 stores a measurement process program Dp for the measurement processes described above that are carried out by the control unit 7 and also stores the offset data Do, the write width data Dw, the read width data Dr, and the like generated by the measurement processes.

Next, the method of manufacturing the magnetic disk 10 will be described with reference to the drawings.

Figure 4:
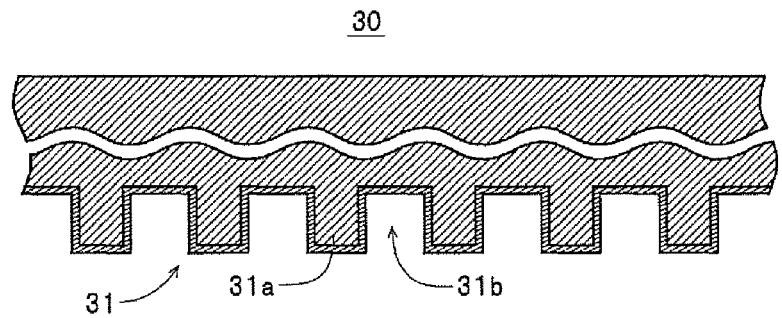
FIG. 4 is a cross-sectional view of a stamper.
Figure 5:
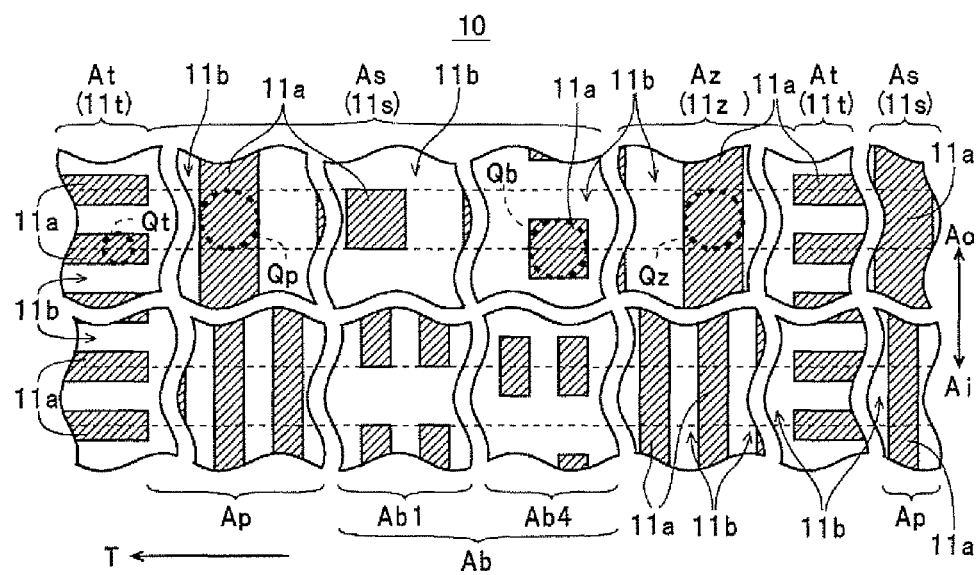
FIG. 5 is a plan view of data track pattern regions, servo pattern regions, and a measurement region on the magnetic disk.
Figure 8:
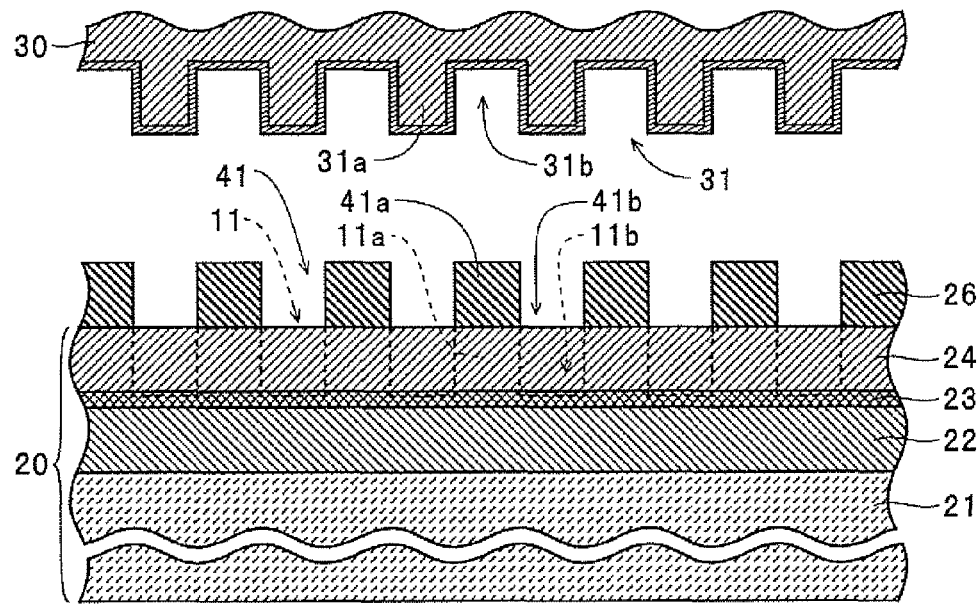
FIG. 8 is a cross-sectional view of a preform and the stamper that is useful in explaining the method of manufacturing the magnetic disk.

When manufacturing the magnetic disk 10 described above, a preform 20 shown in FIG. 8 and a stamper 30 shown in FIG. 4 are used. As shown in FIG. 8, the preform 20 is constructed by forming the soft magnetic layer 22, the intermediate layer 23, and the magnetic layer 24 in the mentioned order on the substrate 21. Also, when manufacturing the magnetic disk 10, to form the mask pattern described earlier, a resist is applied on the magnetic layer 24 of the preform 20 to form a resist layer (resin layer) 26 which has a desired thickness. On the other hand, as shown in FIG. 4, a concave/convex pattern 31 corresponding to the concave/convex patterns 11 (the concave/convex patterns 11t, 11s, 11z) of the magnetic disk 10 is formed on the stamper 30 so that the stamper 30 can manufacture the magnetic disk 10 by imprinting. The concave/convex pattern 31 of the stamper 30 is one example of a "stamper-side concave/convex pattern" for the present invention, and includes convex parts 31a formed corresponding to the concave parts 11b of the concave/convex patterns 11 of the magnetic disk 10 and concave parts 31b formed corresponding to the convex parts 11a of the concave/convex patterns 11. Note that a variety of well-known methods can be used as the method of manufacturing the preform 20 and the method of manufacturing the stamper 30.

When manufacturing the magnetic disk 10 using the preform 20 and the stamper 30, first, as shown in FIG. 8, the concave/convex pattern 31 of the stamper 30 is transferred to the resist layer 26 of the preform 20 by imprinting. More specifically, the surface of the stamper 30 in which the concave/convex pattern 31 is formed is pressed onto the resist layer 26 of the preform 20 to press the convex parts 31a of the concave/convex pattern 31 into the resist layer 26 of the preform 20. When doing so, the resist (the resist layer 26) at positions where the convex parts 31a are pressed in moves inside the concave parts 31b of the concave/convex pattern 31. After doing so, the stamper 30 is separated from the preform 20 and by carrying out an oxygen plasma process to remove resin (not shown) remaining on the base surfaces, as shown in FIG. 8, a concave/convex pattern 41 composed of the resist layer 26 is formed on the magnetic layer 24 of the preform 20. Next, an etching process is carried out using the concave/convex pattern 41 (the resist layer 26) described above as a mask. When doing so, by etching the magnetic layer 24 exposed from the mask (i.e., convex parts 41a) at base parts of concave parts 41b in the concave/convex pattern 41, the plurality of concave parts 11b are formed with a depth that reaches the intermediate layer 23 as shown by the broken lines in FIG. 8. By doing so, the concave/convex patterns 11 are formed (in the magnetic layer 24) on the intermediate layer 23.

Next, by selectively etching the resist layer 26 remaining on the convex parts 11a, the remaining resist layer 26 is completely removed to expose the protruding end surfaces of the convex parts 11a. After this, $SiO_2$ is sputtered as the non-magnetic material 25. When doing so, the non-magnetic material 25 is sputtered so as to completely fill the concave parts 11b with the non-magnetic material 25 and so that a layer of the non-magnetic material 25 is formed with sufficient thickness on the convex parts 11a. After this, ion beam etching is carried out on the layer of non-magnetic material 25 on the magnetic layer 24 (i.e., on the convex parts 11a and on the concave parts 11b). When doing so, the ion beam etching is continued until the protruding end surfaces of the convex parts 11a are exposed from the non-magnetic material 25 in the preamble pattern regions Ap and the measurement regions Az in the outer periphery of the preform 20 (at the positions that will become the outer periphery Ao of the magnetic disk 10).

As described earlier, on the magnetic disk 10 (the preform 20), the concave/convex patterns 11z are formed by forming the concave parts 11b inside the measurement regions Az so that no inscribed circles with a larger diameter than the diameters Qp, Qb of the inscribed circles with the largest diameters out of the inscribed circles inside the data track pattern regions At and the servo pattern regions As are present inside the measurement regions Az (i.e., so that no convex parts 11a with excessively wide protruding end surfaces are present). Accordingly, unlike a conventional magnetic recording medium where the entire offset measurement regions are constructed of convex parts, the protruding end surfaces (i.e., upper surfaces) of the convex parts 11a are exposed from the non-magnetic material 25 without producing thick residue on the convex parts 11a inside the measurement regions Az. By doing so, the ion beam etching is completed on the layer of the non-magnetic material 25 to make the surface of the preform 20 smooth. Next, after the protective layer has been formed by forming a thin film of diamond-like carbon (DLC) by CVD so as to cover the surface of the preform 20, a Fomblin lubricant is applied to the surface of the protective layer. By doing so, as shown in FIG. 3, the magnetic disk 10 is completed.

Next, the measurement process for measuring the offset OW using the hard disk drive 1 will be described with reference to the drawings. Note that before the magnetic disk 10 installed in the hard disk drive 1 is enclosed inside the case (not shown) of the hard disk drive 1, the data track pattern regions At, servo pattern regions As, and the measurement regions Az are entirely DC magnetized.

As one example, when a control signal indicating the start of a measuring process has been outputted from an external apparatus to the hard disk drive 1 in a state where power is being supplied to the hard disk drive 1, the control unit 7 starts the measurement process that measures the offset OW. Here, the control unit 7 first controls the controller 5 to move the magnetic head 2 to the inner periphery Ai of the magnetic disk 10 and, while moving the magnetic head 2 toward the outer periphery Ao, carries out an AC erase process on all of the convex parts 11a in the data track pattern regions At and all of the convex parts 11a inside the measurement regions Az. More specifically, a signal with a higher frequency than the frequency of the signal used to record the data on the data recording tracks in the data track pattern regions At is written using the recording head 2w onto all of the convex parts 11a in the data track pattern regions At and all of the convex parts 11a inside the measurement regions Az. By doing so, the initialization process is completed for the data track pattern regions At and it becomes possible to write measurement signals on the convex parts 11a inside the measurement regions Az.

Figure 9:
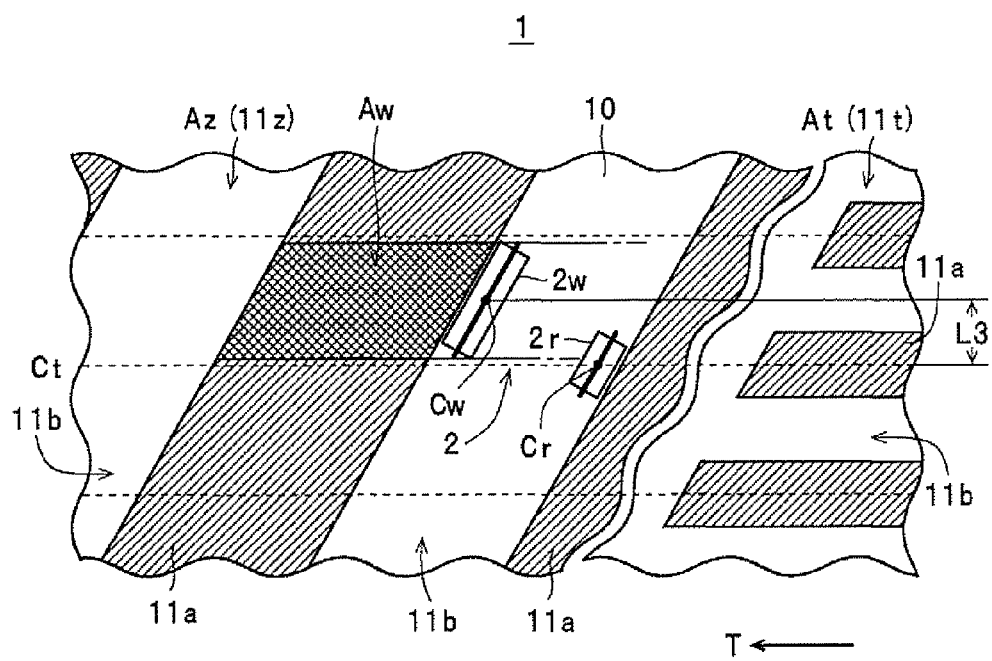
FIG. 9 is a plan view of the magnetic disk and the magnetic head in a state where a measurement signal has been written in a measurement region in a state where the reproducing head is made on-track.

Next, as shown in FIG. 9, the control unit 7 controls the controller 5 so that in a state where the reproducing head 2r is being made on-track to a track (for example a predetermined track in the outer periphery Ao) for which the offset is to be measured (i.e., in a state where the center Cr of the reproducing head 2r matches the track center Ct), measurement signals for measuring the offset are written on the convex parts 11a inside the measurement regions Az for which the erase process described above has been completed. More specifically, a DC magnetization process is carried out on the convex parts 11a inside the measurement regions Az using the recording head 2w. Here, as described earlier, in a state where a skew angle θ is produced in the inner periphery Ai and the outer periphery Ao of the magnetic disk 10, the recording head 2w will be made the distance L3 off-track when the reproducing head 2r is made on-track. Accordingly, as shown in FIG. 9, when a measurement signal for measuring the offset has been written using the recording head 2w (i.e., when the DC magnetization process has been carried out), the center in the radial direction of the region Aw in which the measurement signal has been written (i.e., the region Aw that has been DC magnetized) is located away from the track center Ct.

Next, the control unit 7 reads the measurement signals written on the convex parts 11a inside the measurement regions Az and measures the offset OW based on the measurement results. More specifically, the control unit 7 controls the controller 5 to read the measurement signals described above from the measurement regions Az in a state where the reproducing head 2r has been moved to a measurement position set in advance (a position offset in the radial direction by a predetermined amount from the track center Ct of the target track being measured). When doing so, since the entire areas in the circumferential direction of the convex parts 11a inside the measurement regions Az have been DC magnetized by writing the measurement signals, the reproducing signal read from a measurement region Az using the reproducing head 2r has a pulse waveform corresponding to the formation pitch of the convex parts 11a inside the measurement region Az in the same way as a preamble signal read from a preamble pattern region Ap. After this, in a state where the reproducing head 2r has been moved in the radial direction by a predetermined amount set in advance (for example, around 1/20 of the track pitch), the control unit 7 has the measurement signals read from the measurement regions Az.

Figure 10:
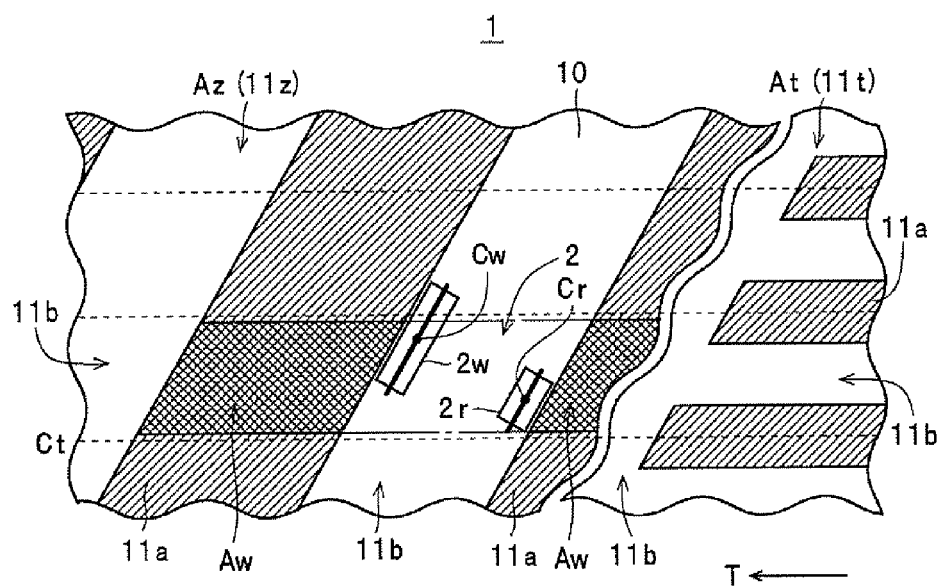
FIG. 10 is a plan view of the magnetic disk and the magnetic head in a state where measurement signals are being read from convex parts in a measurement region.
Figure 11:
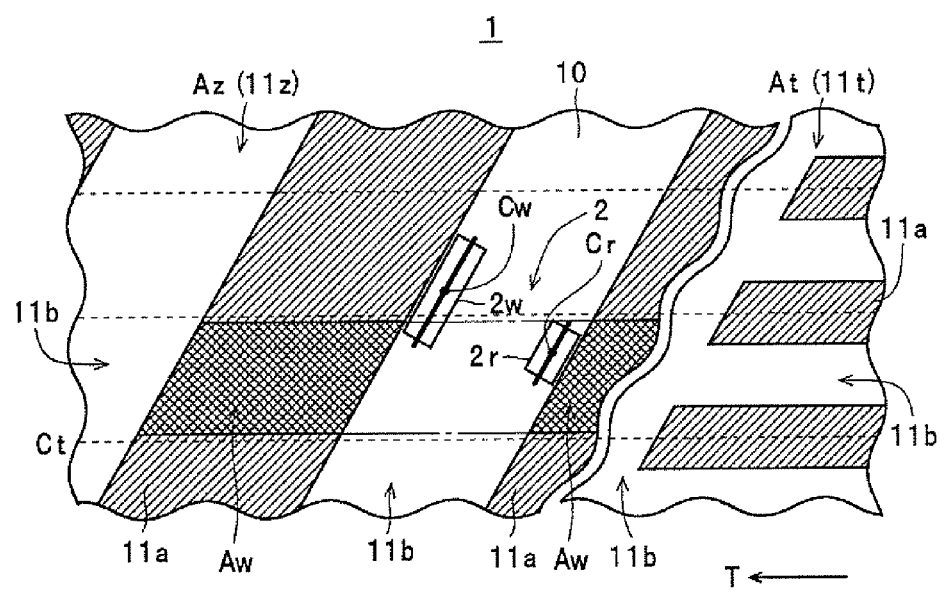
FIG. 11 is another plan view of the magnetic disk and the magnetic head in a state where measurement signals are being read from convex parts in the measurement region.

When doing so, as shown in FIGS. 10 and 11, in a state where the reproducing head 2r almost overlaps the region Aw that has been DC magnetized in the width direction, the amplitude of the reproducing signal read from the measurement region Az becomes comparatively large (that is, a reproducing signal with a large output value is obtained). On the other hand, in a state (not shown) where only part of the reproducing head 2r overlaps the region Aw in the width direction, the amplitude of the reproducing signal read from the measurement region Az decreases. This means that whenever the reproducing head 2r moves, by obtaining and comparing the amplitude of the reproducing signal, it is possible to specify positions of the reproducing head 2r where the reproducing head 2r substantially overlaps the region Aw, and by doing so, it is possible to specify the length in the radial direction of the region Aw. Accordingly, the center in the radial direction of the region Aw, that is, a position corresponding to the center Cw of the recording head 2w when the measurement signal was written can be specified based on the specified length. More specifically, the control unit 7 specifies the head position of the reproducing head 2r when the amplitude of the reproducing signal read using the reproducing head 2r reaches its maximum value, or the center of a movement range of the reproducing head 2r from which a reproducing signal with a maximum amplitude is read, as the center in the radial direction of the region Aw. Next, the control unit 7 calculates the distance between the specified center and the track center Ct of the track to which the reproducing head 2r is being made on-track when the measurement signal was written in the region Aw as the offset OW, and stores the calculation result in the storage unit 8 as the offset data Do for that track.

After this, the control unit 7 sequentially carries out the write process for the measurement signals, the read process for the measurement signals, and the calculation process for the offset OW described above at intervals of several hundred tracks for the entire range from the outer periphery Ao to the inner periphery Ai of the magnetic disk 10. After the processes described above have been carried out at intervals of several hundred tracks across the entire range of the magnetic disk 10, the control unit 7 carries out an interpolation process based on the calculation results (i.e., the offset data Do stored in the storage unit 8) to calculate the offset OW for the tracks for which the processes such as the writing and reading of measurement signals were not carried out. By doing so, offset data Do for the entire magnetic disk 10 is stored in the storage unit 8 corresponding to each track.

Next, the measurement process for the head widths carried out by the hard disk drive 1 will be described with reference to the drawings.

Figure 12:
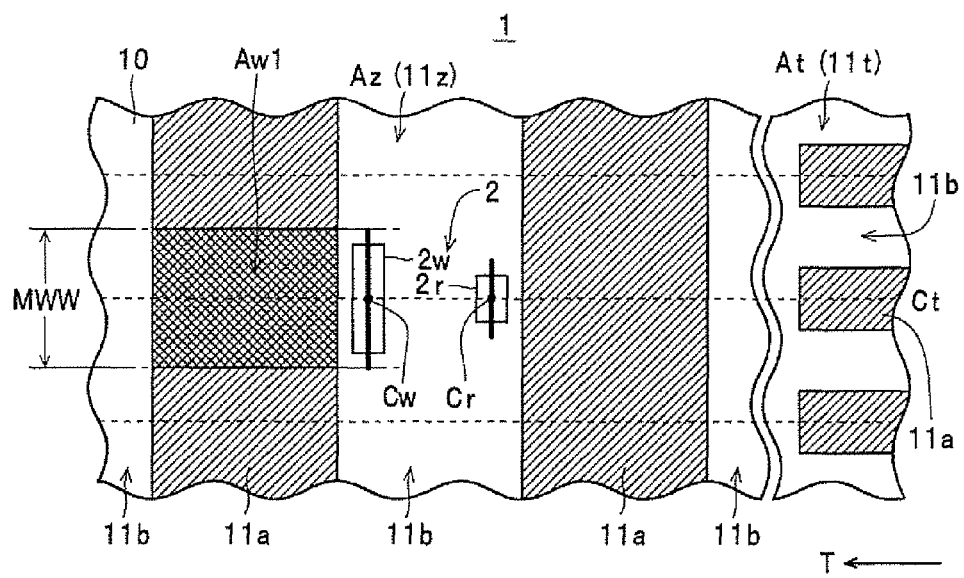
FIG. 12 is a plan view of the magnetic disk and the magnetic head in a state where a measurement signal has been written on a convex part in the measurement region in a state where the recording head is made on-track.
Figure 13:
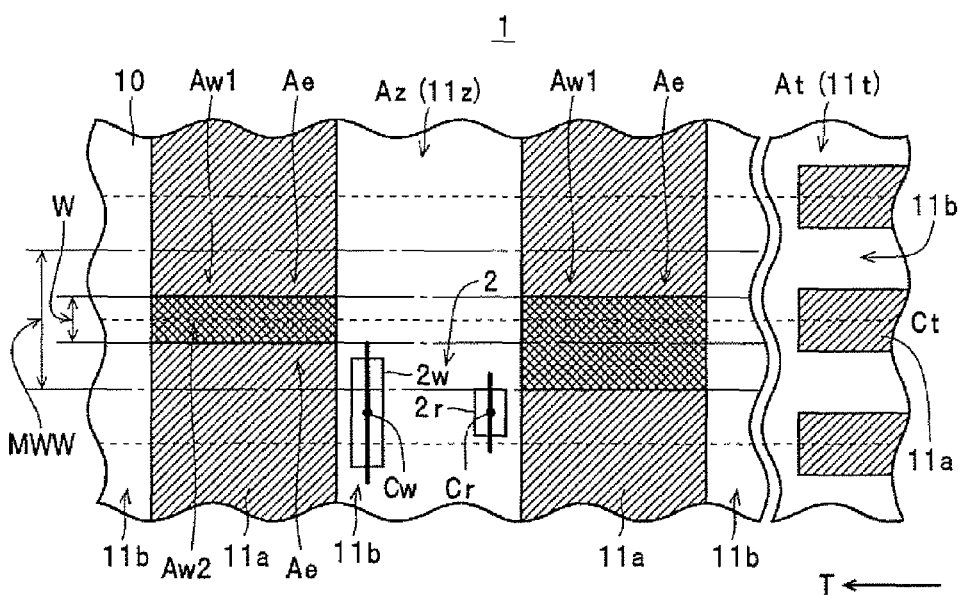
FIG. 13 is a plan view of the magnetic disk and the magnetic head in a state where an AC erase process has been carried out on an outer periphery part and an inner periphery part of a region where a measurement signal was written.

When the measurement process for the offset OW described above has been completed, the control unit 7 starts the measurement process for the magnetic write width MWW and the magnetic read width MRW described earlier. In this measurement process, the control unit 7 first carries out an AC erase process on the convex parts 11a inside each measurement region Az in which measurement signals were written during the measurement process for the offset OW described above across the entire range from the inner periphery Ai to the outer periphery Ao of the magnetic disk 10. Next, as shown in FIG. 12, as one example, in a state where the recording head 2w has been made on-track to a predetermined track in the central periphery Ac of the magnetic disk 10 (i.e., in a state where the center Cw of the recording head 2w has been aligned with the track center Ct), measurement signals for measuring the widths of the heads are written (i.e., a DC magnetization process is carried out) on the convex parts 11a in each measurement region Az.

Next, the control unit 7 reads the measurement signals written on the convex parts 11a in the measurement regions Az and obtains the magnetic write width MWW based on the result of such reading. More specifically, the control unit 7 controls the controller 5 to have the measurement signals described above read from the measurement regions Az in a state where the reproducing head 2r has been moved to a measurement position that is set in advance (i.e., a position where the reproducing head 2r has been moved in the radial direction by a predetermined amount from the track center Ct of the track being measured). Next, after the control unit 7 has moved the reproducing head 2r in the radial direction by a predetermined amount set in advance (for example, around 1/20 of the track pitch), the control unit 7 has the measurement signals read from the measurement regions Az. When doing so, in the same way as during the measurement process for the offset OW described earlier, in a state where the reproducing head 2r almost overlaps the region Aw1 that has been DC magnetized in the width direction due to a measurement signal being written, the amplitude of the reproducing signal read from the measurement region Az becomes comparatively large (that is, a reproducing signal with a large output value is obtained). On the other hand, in a state where only part of the reproducing head 2r overlaps the region Aw1 in the width direction, the amplitude of the reproducing signal read from the measurement region Az decreases.

This means that by obtaining and comparing the amplitude of the reproducing signal whenever the reproducing head 2r moves, it is possible to calculate the length in the radial direction of the region Aw1, that is, the magnetic write width MWW based on the amplitude of the reproducing signal and the head position of the reproducing head 2r during reading. More specifically, as one example, in a profile of the head position of the reproducing head 2r and the amplitude, the profile width at a value that is half the maximum amplitude is set as the magnetic write width MWW. Next, the control unit 7 stores the calculated magnetic write width MWW in the storage unit 8 as the write width data Dw. This completes the measurement process for the magnetic write width MWW. Note that although a construction that carries out a measurement process for the magnetic write width MWW in the central periphery Ac of the magnetic disk 10 has been described, it is also possible to use a construction that carries out the measurement process across the entire range from the inner periphery Ai to the outer periphery Ao of the magnetic disk 10, or in a part of such range aside from the central periphery Ac. When doing so, in the same way as the measurement process for the offset OW described earlier, it is also possible to use a construction that carries out the measurement process for the magnetic write width MWW at intervals of several hundred tracks and an interpolation process to calculate the magnetic write width MWW of the tracks for which the measurement process is not carried out.

Next, the control unit 7 starts the measurement process for the magnetic read width MRW. During the measurement process for the magnetic read width MRW, as shown in FIG.

Figure 14:
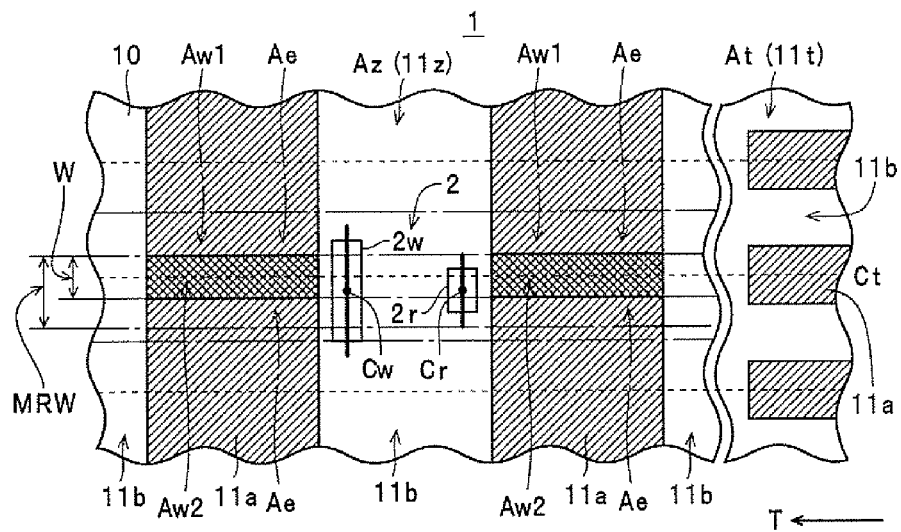
FIG. 14 is a plan view of the magnetic disk and the magnetic head in a state where a measurement signal is being read from a convex part in the measurement region after the AC erase process has been completed.

13, the control unit 7 first carries out an AC erase process on a region Ae that is an inner periphery one third and a region Ae that is an outer periphery one third in the radial direction of each region Aw1 where a measurement signal was written on the convex parts 11a during the measurement process for the magnetic write width MWW (i.e., each region Aw1 previously subjected to the DC magnetization process). By doing so, a state where only regions Aw2 whose width W in the radial direction is one third of the length (in this example, the magnetic write width MWW) in the radial direction of the region Aw1 are DC magnetized is produced (i.e., the width W in the radial direction of the regions Aw2 is made narrower than the magnetic read width MRW to be measured). Next, while moving the reproducing head 2r in the radial direction, the control unit 7 reads the measurement signals from the regions Aw2 using the reproducing head 2r and obtains the magnetic read width MRW described above based on the result of such reading. When doing so, as shown in FIG. 14, in a state where the entire width in the radial direction of the regions Aw2 that have been DC magnetized is positioned within the magnetic read width MRW of the reproducing head 2r, the amplitude of the reproducing signal read from the measurement regions Az becomes comparatively large (i.e., a reproducing signal with a large output value is obtained). On the other hand, when only part of the width in the radial direction of the regions Aw2 that have been DC magnetized is positioned within the magnetic read width MRW of the reproducing head 2r, the amplitude of the reproducing signal read from the measurement regions Az decreases.

This means that by obtaining and comparing the amplitude of the reproducing signal whenever the reproducing head 2r moves, it is possible to calculate the magnetic read width MRW of the reproducing head 2r based on the amplitude and the head position of the reproducing head 2r during reading. More specifically, as one example, in a profile of the head position of the reproducing head 2r and the amplitude, the profile width at a value that is half the maximum amplitude is set as the magnetic read width MRW. Next, the control unit 7 stores the calculated magnetic read width MRW in the storage unit 8 as the read width data Dr. Note that although a construction that carries out the measurement process for the magnetic read width MRW in the central periphery Ac of the magnetic disk 10 has been described, it is also possible to use a construction that carries out the measurement process across the entire range from the inner periphery Ai to the outer periphery Ao of the magnetic disk 10, or in a part of such range aside from the central periphery Ac. When doing so, in the same way as the measurement process for the offset OW described earlier, it is possible to use a construction that carries out the measurement process for the magnetic read width MRW at intervals of several hundred tracks and an interpolation process to calculate the magnetic read width MRW of the tracks for which the measurement process is not carried out. This completes the measurement process for the magnetic read width MRW.

In this way, according to the magnetic disk 10, by disposing a measurement region (at least one "predetermined region") that differs to the data track pattern regions At between two servo pattern regions As that are adjacent in the circumferential direction and forming the concave/convex pattern 11z with a plurality of convex parts 11a ("first convex parts") that are formed continuously in the radial direction in each measurement region Az, unlike a conventional magnetic recording medium where the entire offset measurement regions are constructed of convex parts, the length in the circumferential direction of the convex parts 11a inside the measurement regions Az is sufficiently short, making it possible to avoid a state where the flying height of a head greatly differs between the data track pattern regions At, the servo pattern regions As, and the measurement regions Az. Also, even if the concave parts 11b are filled with the non-magnetic material 25, since no excessively wide convex parts 11a will be present in the measurement regions Az, it will be possible to expose the protruding end surfaces (the upper surfaces) of the convex parts 11a from the non-magnetic material 25 without producing thick residue on the convex parts 11a inside the measurement regions Az. As a result, it is possible to provide a magnetic disk 10 with favorable surface smoothness. Also, by installing the magnetic disk 10 in the hard disk drive 1, it is possible to provide a hard disk drive 1 that can measure the predetermined parameters for the recording head 2w and the reproducing head 2r with high precision without causing fluctuations in the flying height of the head or deterioration in the surface smoothness.

Also, according to the magnetic disk 10, by disposing the measurement regions Az (the "predetermined regions") between a data track pattern region At and a servo pattern region As that is adjacent in the circumferential direction to the data track pattern region At, it is possible to form the data track pattern regions At and the servo pattern regions As continuously in the circumferential direction without such regions being interrupted by the measurement regions Az.

In addition, according to the magnetic disk 10, by forming first convex parts in the measurement regions Az so that the diameter of the inscribed circle Qz with the largest diameter out of the inscribed circles on the protruding end surfaces of the first convex parts (i.e., the convex parts 11a in the concave/convex patterns 11z) is no greater than (in this example, equal to) the diameters of the inscribed circles Qp, Qb with the largest diameters out of the inscribed circles on the protruding end surfaces of the second convex parts formed in the data track pattern regions At (i.e., the convex parts 11a in the concave/convex patterns 11t) and the third convex parts formed in the servo pattern regions As (i.e., the convex parts 11a in the concave/convex patterns 11s), the measurement regions Az do not include convex parts 11a with wide protruding end surfaces that can have inscribed circles with a diameter that exceeds the diameter of the inscribed circles (in this example, the inscribed circles Qp, Qb) with the largest diameters out of the inscribed circles on the protruding end surfaces of the convex parts 11a in the data track pattern regions At and the servo pattern regions As. By doing so, during the etching of the layer of non-magnetic material 25 formed so as to cover the concave/convex patterns 11z inside the measurement regions Az, it is possible to reliably avoid a state where thick residue is produced inside the measurement regions Az. This means that it is possible to provide a magnetic disk 10 that has favorable surface smoothness and from which recorded data, servo data, and the like can be reliably read.

According to the stamper 30 used to manufacture the magnetic disk 10, since a stamper side concave/convex pattern (the concave/convex pattern 31) is formed corresponding to the concave/convex patterns 11 (the concave/convex patterns 11t, 11s, and 11z) of the magnetic disk 10 described above, during the imprinting process carried out on the resist layer 26 formed on the preform 20, it is possible to form a concave/convex pattern 41 where no convex parts 41a with wide protruding end surfaces are present in the measurement regions Az. Accordingly, by carrying out an etching process on the preform 20 using the concave/convex pattern 41 or a concave/convex pattern where the positional relationship between the convexes and the concaves matches the concave/convex pattern 41 as a mask pattern, it is possible to form the concave/convex patterns 11 where no convex parts 11a with wide protruding end surfaces are present in the measurement regions Az or the like. Accordingly, it is possible to manufacture the magnetic disk 10 so that the flying height of the head is substantially uniform between the data track pattern regions At, the servo pattern regions As, and the measurement regions Az. Even with a construction where the concave parts 11b of the concave/convex patterns 11 are filled with the non-magnetic material 25, during etching of the layer of the non-magnetic material 25 formed so as to cover the concave/convex patterns 11 formed using the stamper 30, it will be possible to avoid a situation where thick residue is produced on the convex parts 11a in the measurement regions Az. This means that it is possible to manufacture a magnetic disk 10 that has favorable surface smoothness and from which recorded data, servo data, and the like can be reliably read.

According to the hard disk drive 1 and the method of measuring a parameter in the hard disk drive 1, measurement signals are written using the recording head 2w onto the first convex parts inside the measurement regions Az ("predetermined regions") that include concave/convex patterns 11z with a plurality of first convex parts (the convex parts 11a of the concave/convex patterns 11z) disposed in the circumferential direction and the concave parts 11b formed continuously in the radial direction in between, the measurement signals are read using the reproducing head 2r, and the predetermined parameter for the present invention is measured based on the read results. This means that the flying height of the head can be kept substantially uniform across the entire magnetic disk 10. As a result, it is possible to measure the predetermined parameter with high precision without causing recording errors or reading errors for the measurement signals.

In addition, according to the hard disk drive 1, by measuring the distance (i.e., the offset OW) in the radial direction between the center Cw of the recording head 2w and the center Cr of the reproducing head 2r as the measurement of a predetermined parameter according to the present invention, it is possible to properly measure the offset OW for the entire range from the inner periphery Ai to the outer periphery Ao of the magnetic disk 10 in a hard disk drive 1 where the relative positional relationship between the recording head 2w and the reproducing head 2r differs due to manufacturing errors and differences between individual components. As a result, it is possible to make the recording head 2w and the reproducing head 2r reliably on-track to each track.

In addition, according to the hard disk drive 1, by measuring the magnetic write width MWW of the recording head 2w and the magnetic read width MRW of the reproducing head 2r as the measurement of predetermined parameters according to the present invention, it is possible to properly measure the magnetic write width MWW and the magnetic read width MRW in a state where the magnetic disk 10 actually installed in the hard disk drive 1 has been combined with the magnetic head 2 (i.e., the recording head 2w and the reproducing head 2r). By doing so, various control parameters for tracking servo control can be finely adjusted individually for each actual hard disk drive 1 based on the measured magnetic write width MWW and the magnetic read width MRW. It is also possible to finely adjust the write current based on the measured magnetic write width MWW and to adjust the gain based on the measured magnetic read width MRW. Accordingly, it is possible to provide a hard disk drive 1 that can reliably record data and can reliably read the recorded data and the servo data across the entire range from the inner periphery Ai to the outer periphery Ao of the magnetic disk 10.

It should be noted that the present invention is not limited to the construction and method described above. For example, although a magnetic disk 10 has been described where a plurality of convex parts whose length in the radial direction is equal to the length in the radial direction of each measurement region Az are formed in the circumferential direction inside each measurement region Az (i.e., in each "predetermined region"), as one example, it is possible to use a construction where convex parts 11a (another example of "convex parts formed continuously in the radial direction") whose length in the circumferential direction is equal to the length in the circumferential direction of the measurement region Az and whose length in the radial direction is around several tens of tracks are formed in the radial direction in each measurement region Az (i.e., in each "predetermined region"). Also, although a magnetic disk 10 where the measurement regions Az are each disposed between a data track pattern region At and a servo pattern region As that are adjacent in the circumferential direction has been described, the position of the "predetermined regions" for the present invention is not limited to this. For example, it is possible to use a construction where each data track pattern region At is divided in two in the direction of rotation (the circumferential direction) of the magnetic disk and a measurement region Az is disposed between the upstream data track pattern region and the downstream data track pattern region or a construction where each servo pattern region As is divided in two in the direction of rotation (the circumferential direction) of the magnetic disk and a measurement region Az is disposed between the upstream servo pattern region and the downstream servo pattern region. Also, although the magnetic disk 10 has been described where the measurement regions Az are respectively disposed between all of the data track pattern regions At and the servo pattern regions As that are alternately disposed in the circumferential direction, the number of "predetermined regions" (in the example above, the measurement regions Az) provided on the magnetic recording medium according to the present invention is not limited to this, and it is possible to set any freely chosen number (i.e., one or more tracks) of "predetermined regions" (the measurement regions Az) per rotation of the magnetic recording medium.

In addition, although a construction that finds the offset data Do by measuring the offset OW at intervals of several hundred tracks across the entire range from the inner periphery Ai to the outer periphery Ao of the magnetic disk 10 and calculates the offset data Do for the remaining tracks by carrying out an interpolation process has been described, the present invention is not limited to this and it is possible to use a construction that carries out the measurement process described above for every track from the inner periphery Ai to the outer periphery Ao of the magnetic disk 10. In the same way, the measurement process for the magnetic write width MWW and the magnetic read width MRW is not limited to being carried out in only the central periphery Ac of the magnetic disk 10 or at intervals of several hundred tracks across the entire range from the inner periphery Ai to the outer periphery Ao of the magnetic disk 10 and it is possible to use a construction where the measurement process described above is carried out for every track from the inner periphery Ai to the outer periphery Ao of the magnetic disk 10.

In addition, when using a construction that carries out the processes for measuring the predetermined parameters for the present invention at intervals of a predetermined number of tracks, it is possible to carry out the measurement processes at intervals of a freely chosen number of tracks (i.e., one or more tracks). Here, it is possible to use a construction that carries out measurement processes for any two tracks between the inner periphery Ai and the outer periphery Ao on the magnetic disk 10 to find the distances L1, L2 for the equation "distance L3=distance L1×sin θ+distance L2×cos θ" given earlier based on the obtained measurement results (calculation results) and the skew angles θ for the two tracks subjected to the measurement processes so as to calculate the distance L3 for each track for which the measurement processes are not carried out based on the skew angle θ for such tracks. By using this construction, compared to a construction that carries out the measurement processes on every track, for example, it is possible to measure the offset OW and the like in a short time.

Figure 15:
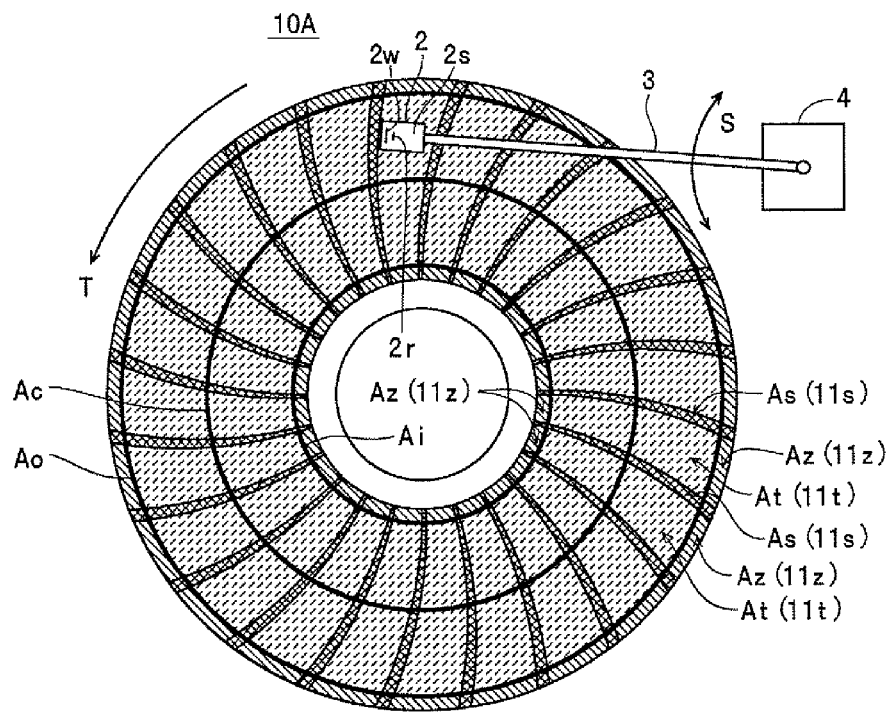
FIG. 15 is a plan view of another magnetic disk.
Figure 16:
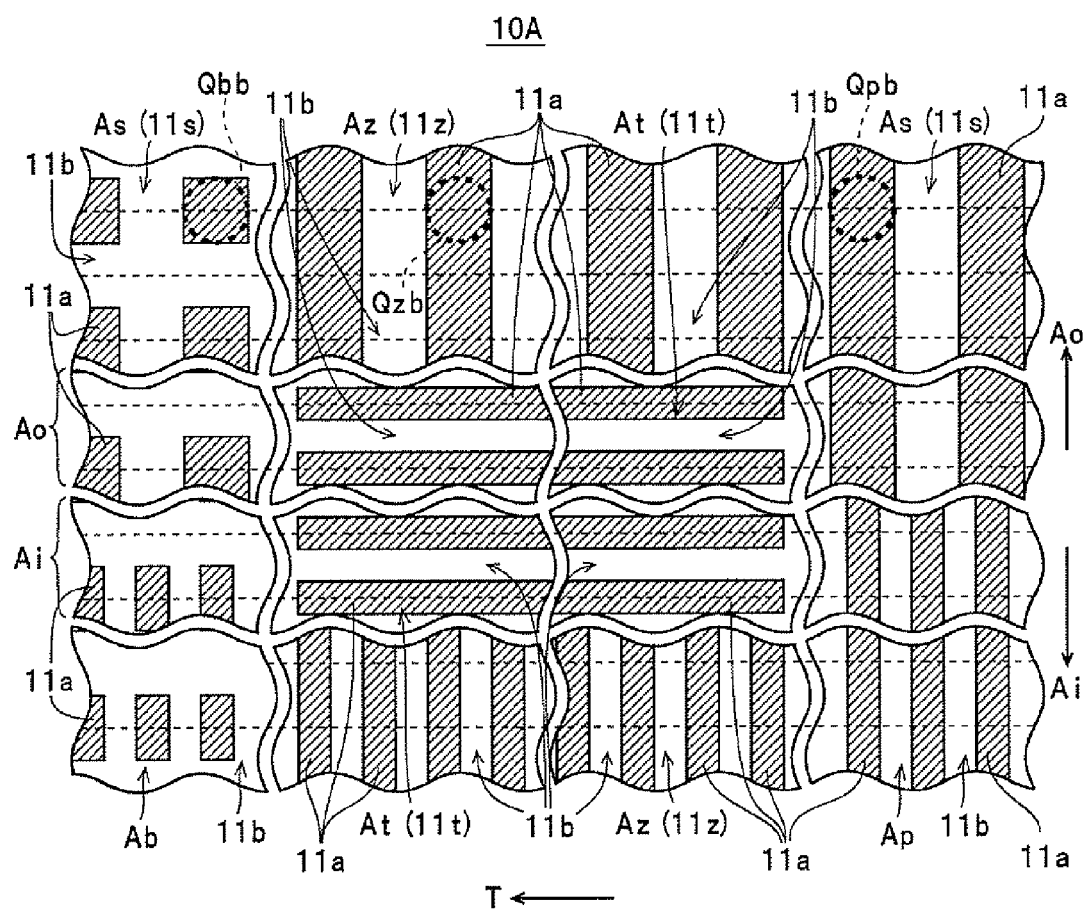
FIG. 16 is a plan view of data track pattern regions, servo pattern regions, and measurement regions on the other magnetic disk.

Also, although the magnetic disk 10 where a measurement region Az (a "predetermined region") is disposed between a data track pattern region At and a servo pattern region As that is adjacent to the data track pattern region At in the circumferential direction has been described, as one example, like a magnetic disk 10A shown in FIG. 15 it is possible to set measurement regions Az corresponding to the "predetermined regions" for the present invention at positions that are between two servo pattern regions As that are adjacent in the circumferential direction and are located on at least one of the outer periphery side and the inner periphery side (in this example, both the outer periphery and inner periphery sides) relative to the data track pattern regions At. Note that component elements of this magnetic disk 10A that are the same as on the magnetic disk 10 described earlier have been assigned the same reference numerals and duplicated description thereof has been omitted. On the magnetic disk 10A, as shown in FIG. 16, as one example, the concave/convex patterns 11z are formed in the measurement regions Az by forming the convex parts 11a inside the measurement regions Az in the same way as the convex parts 11a inside the preamble pattern regions Ap inside the servo pattern regions As. More specifically, in the measurement region Az on the outer periphery side relative to the data track pattern region At, the convex parts 11a and the concave parts 11b are formed in the same way as in the outer periphery Ao of the concave/convex patterns 11s formed in the preamble pattern regions Ap and in the measurement region Az on the inner periphery side relative to the data track pattern region At, the convex parts 11a and the concave parts 11b are formed in the same way as in the inner periphery Ai of the concave/convex patterns 11s formed in the preamble pattern regions Ap.

Accordingly, on the magnetic disk 10A, in the same way as the magnetic disk 10 described earlier, the diameter of the largest-diameter inscribed circle Qzb (as one example, an inscribed circle on the protruding end surface on an outer periphery Ao side of a convex part 11a in the measurement region Az) on the protruding end surface of a convex part 11a in the measurement regions Az on the outer periphery Ao side relative to the data track pattern regions At is equal to the diameter of the largest-diameter inscribed circles Qpb, Qbb out of the inscribed circles in the data track pattern regions At and the servo pattern regions As. That is, the concave/convex patterns 11z are formed by forming the concave parts 11b inside the measurement regions Az so that no inscribed circles with diameters that exceed the diameters of the inscribed circles Qpb, Qbb with the largest diameters out of the inscribed circles inside the data track pattern regions At and the servo pattern regions As are present in the measurement regions Az (i.e., so that convex parts 11a with excessively wide protruding end surfaces are not present in the measurement regions Az). Accordingly, unlike the conventional magnetic recording medium where the entire offset measurement regions are composed of convex parts, when carrying out an etching process on the layer of the non-magnetic material 25 during the manufacturing of the magnetic disk 10A, it is possible to expose the protruding end surfaces (i.e., the upper surfaces) of the convex parts 11a from the non-magnetic material 25 without producing thick residue on the convex parts 11a inside the measurement regions Az.

When carrying out the measurement processes for the offset OW, the magnetic write width MWW, and the magnetic read width MRW described earlier in a hard disk drive 1 equipped with the magnetic disk 10A, the control unit 7 carries out writing and reading of measurement signals on the convex parts 11a inside the measurement regions Az set on the outer periphery Ao side and the inner periphery Ai side of the data track pattern regions At. Here, it is possible to use a construction that carries out the measurement processes for measurement regions Az on the outer periphery Ao side and measurement regions Az on the inner periphery Ai side on the magnetic disk 10A and finds the distances L1, L2 for the equation "distance L3=distance L1×sin θ+distance L2×cos θ" given earlier based on the obtained measurement results (calculation results) and the skew angles θ at radial positions where the measurement processes were carried out in both regions so as to calculate the distance L3 for each track at positions where the data track pattern regions At are formed based on the skew angle θ for each track.

In this way, according to the magnetic disk 10A, by setting the measurement regions Az (the "predetermined regions") on at least one of the outer periphery side and the inner periphery side (in this example, both the outer periphery and inner periphery sides) relative to the data track pattern regions At in the radial direction, it is possible to form the data track pattern regions At and the servo pattern regions As continuously in the radial direction without such regions being interrupted by the measurement regions Az. Note that it is also possible to freely set the measurement regions Az on the magnetic recording medium by appropriately combining the set positions of the measurement regions Az of the magnetic disk 10 described earlier and the measurement regions Az of the magnetic disk 10A described above.

Also, although an example where the measurement process for the magnetic write width MWW and the measurement process for the magnetic read width MRW are carried out in the mentioned order following the completion of the measurement process for the offset OW has been described, the method of measuring a parameter according to the present invention is not limited to this, and it is possible to use a method of measuring a parameter where only one of the measurement process for the offset OW, the measurement process for the magnetic write width MWW and the measurement process for the magnetic read width MRW is carried out. Furthermore, although an example has been described where the offset OW, the magnetic write width MWW, and the magnetic read width MRW are measured during the measurement processes based on the reproducing signal for the DC magnetized regions Aw (or the regions Aw1, Aw2) after the first convex parts for the present invention have been subjected to an AC erase process and then DC magnetized by writing the measurement signals, the present invention is not limited to this. For example, it is also possible to use a construction where in a state where the entire area of every first convex part for the present invention has been DC magnetized, an AC erase process is carried out using the recording head 2w (another example of "writing measurement signals") on regions corresponding to the regions Aw, Aw1, and Aw2 that were DC magnetized during the measurement processes described earlier and the offset OW, the magnetic write width MWW, and the magnetic read width MRW are then measured based on reproducing signals for such regions. Note that in this case, during the measurement process for the magnetic read width MRW, by DC magnetizing both sides in the radial direction (i.e., the regions corresponding to the regions Ae described earlier) of the region Aw1 on which the AC erase process has been carried out, it is possible to read measurement signals in a state where only a region that corresponds to the region Aw2 has been AC erased. In the method of measuring that writes measurement signals by carrying out an AC erase process, a reproducing signal with a small amplitude is obtained at head positions where a reproducing signal with a large amplitude was obtained in the measurement process described earlier and a reproducing signal with a large amplitude is obtained at head positions where a reproducing signal with a small amplitude was obtained. Accordingly, when measuring the offset OW, for example, the head position of the reproducing head 2r where the amplitude of the reproducing signal reaches a minimum or the center of a range of head positions where a reproducing signal with the minimum amplitude is read is specified as the center in the radial direction of the region Aw. By doing so, the offset OW can be measured in the same way as in the measurement process described earlier.

Also, although an example where the entire areas in the radial direction of the convex parts 11a are DC magnetized by writing measurement signals has been described, the present invention is not limited to this and it is possible to use a construction where measurement signals whose wavelength is shorter than the formation pitch of the convex parts 11a (for example, measurement signals of a frequency that is higher than the frequency of the reproducing signal produced from a preamble pattern) are written on the first convex parts and the offset OW, the magnetic write width MWW, and the magnetic read width MRW are measured by reading the written measurement signals. Here, to obtain a reproducing signal with a large output value, at least one cycle of the measurement signal should preferably be recorded on each convex part 11a. Accordingly, when the convex parts 11a of the measurement regions Az are formed in the same way as the convex parts 11a inside the preamble pattern regions Ap, measurement signals with a wavelength that is no greater than half the formation pitch of the preamble patterns should preferably be recorded. Note that as the method of writing the measurement signals, it is possible to use a method of writing measurement signals of a predetermined frequency on the first convex parts in a state where the entire areas of the first convex parts to be written upon have been subjected to AC erasing or a method of writing measurement signals of a predetermined frequency on the first convex parts in a state where the entire areas of the first convex parts to be written upon have been subjected to DC magnetizing. In addition, although a construction where the control unit 7 of the hard disk drive 1 carries out the measurement processes has been described, the present invention is not limited to this and it is possible to use a construction where the hard disk drive 1 is connected to a testing apparatus (not shown) and the measurement processes described above are carried out by a control unit of the testing apparatus. With this construction, the hard disk drive 1 and the testing apparatus together construct a "recording/reproducing apparatus" for the present invention.

What is claimed is:

1. A magnetic recording medium on which data track pattern regions, in which data track patterns are formed by concave/convex patterns comprising convex parts, at least protruding end parts of which are formed of magnetic material, and servo pattern regions, in which servo patterns are formed by concave/convex patterns comprising convex parts, at least protruding end parts of which are formed of magnetic material, are provided so as to be alternately disposed in a circumferential direction and on which at least one predetermined region that differs to both the data track pattern regions and the servo pattern regions is provided, each predetermined region being disposed between two servo pattern regions out of the servo pattern regions that are adjacent in the circumferential direction, wherein in each servo pattern region, a preamble pattern region in which a preamble pattern as the servo patterns is formed, an address pattern region in which an address pattern as the servo patterns is formed, and a burst pattern region in which a burst pattern as the servo patterns is formed, are provided, and a concave/convex pattern including a plurality of first convex parts, at least protruding end parts of which are formed of magnetic material, formed continuously in a radial direction is formed in each predetermined region, the first convex parts being formed so that a diameter of a virtual inscribed circle with a largest diameter out of virtual inscribed circles on protruding end surfaces of the first convex parts is no greater than a diameter of a virtual inscribed circle with a largest diameter out of virtual inscribed circles on protruding end surfaces of second convex parts as the convex parts formed inside the data track pattern regions and virtual inscribed circles on protruding end surfaces of third convex parts as the convex parts formed inside the servo pattern regions.

2. A magnetic recording medium according to claim 1, wherein each predetermined region is disposed between a data track pattern region out of the data track pattern regions and a servo pattern region out of the servo pattern regions that is adjacent to the data track pattern region out of the data track pattern regions in the circumferential direction and the concave/convex patterns are formed so that the data track pattern regions, the servo pattern regions, and each predetermined region are respectively continuous in the circumferential direction.

3. A stamper on which is formed a stamper-side concave/convex pattern corresponding to the concave/convex patterns on a magnetic recording medium according to claim 1.

4. A recording/reproducing apparatus comprising:
the magnetic recording medium according to claim 1;
a recording head that writes signals on the magnetic recording medium;
a reproducing head that reads signals written on the magnetic recording medium; and
a control unit that controls writing of the signals by the recording head and reading of the signals by the reproducing head and measures a predetermined parameter for at least one of the recording head and the reproducing head by writing and reading measurement signals on the magnetic recording medium,
wherein when measuring the predetermined parameter, the control unit writes the measurement signals using the recording head on the first convex parts, reads the measurement signals using the reproducing head, and measures the predetermined parameter based on a result of reading the measurement signals.

5. A recording/reproducing apparatus according to claim 4, wherein as measurement of the predetermined parameter, the control unit measures a distance in the radial direction between a center of a length of the recording head in a direction corresponding to the radial direction of the magnetic recording medium and a center of a length of the reproducing head in the direction corresponding to the radial direction.

6. A recording/reproducing apparatus according to claim 4, wherein as measurement of the predetermined parameter, the control unit measures at least one of a magnetic write width of the recording head and a magnetic read width of the reproducing head.

7. A method of measuring a parameter for a recording/reproducing apparatus that includes: a magnetic recording medium; a recording head that writes signals on the magnetic recording medium; and a reproducing head that reads signals written on the magnetic recording medium, the method comprising writing and reading measurement signals on the magnetic recording medium, thereby measuring a predetermined parameter for at least one of the recording head and the reproducing head, wherein:

the writing the measurement signals is performed by using the recording head on the first convex parts formed in each predetermined region in the magnetic recording medium according to claim 1 as the magnetic recording medium;

the reading the measurement signals is performed by using the reproducing head; and the measuring the predetermined parameter is performed based on a result of the reading the measurement signals.

8. A magnetic recording medium on which data track pattern regions, in which data track patterns are formed by concave/convex patterns comprising convex parts, at least protruding end parts of which are formed of magnetic material, and servo pattern regions, in which servo patterns are formed by concave/convex patterns comprising convex parts, at least protruding end parts of which are formed of magnetic material, are provided so as to be alternately disposed in a circumferential direction and on which at least one predetermined region that differs to both the data track pattern regions and the servo pattern regions is provided, each predetermined region being disposed between two servo pattern regions out of the servo pattern regions that are adjacent in the circumferential direction, wherein:

in each servo pattern region, a preamble pattern region in which a preamble pattern as the servo patterns is formed, an address pattern region in which an address pattern as the servo patterns is formed, and a burst pattern region in which a burst pattern as the servo patterns is formed, are provided, and each predetermined region is set on at least one of an inner periphery side and an outer periphery side relative to the data track pattern regions in the radial direction, and a concave/convex pattern including a plurality of first convex parts, at least protruding end parts of which are formed of magnetic material, formed continuously in the radial direction is formed in each predetermined region.

9. A stamper on which is formed a stamper-side concave/convex pattern corresponding to the concave/convex patterns on a magnetic recording medium according to claim 8.

10. A recording/reproducing apparatus comprising:

the magnetic recording medium according to claim 8;

a recording head that writes signals on the magnetic recording medium;

a reproducing head that reads signals written on the magnetic recording medium; and a control unit that controls writing of the signals by the recording head and reading of the signals by the reproducing head and measures a predetermined parameter for at least one of the recording head and the reproducing head by writing and reading measurement signals on the magnetic recording medium, wherein when measuring the predetermined parameter, the control unit writes the measurement signals using the recording head on the first convex parts, reads the measurement signals using the reproducing head, and measures the predetermined parameter based on a result of reading the measurement signals.

11. A recording/reproducing apparatus according to claim 10, wherein as measurement of the predetermined parameter, the control unit measures a distance in the radial direction between a center of a length of the recording head in a direction corresponding to the radial direction of the magnetic recording medium and a center of a length of the reproducing head in the direction corresponding to the radial direction.

12. A recording/reproducing apparatus according to claim 10, wherein as measurement of the predetermined parameter, the control unit measures at least one of a magnetic write width of the recording head and a magnetic read width of the reproducing head.

13. A method of measuring a parameter for a recording/reproducing apparatus that includes: a magnetic recording medium; a recording head that writes signals on the magnetic recording medium; and a reproducing head that reads signals written on the magnetic recording medium, the method comprising writing and reading measurement signals on the magnetic recording medium, and measuring a predetermined parameter for at least one of the recording head and the reproducing head, wherein:

the writing the measurement signals is performed by using the recording head on the first convex parts formed in each predetermined region in the magnetic recording medium according to claim 8 as the magnetic recording medium;

the reading the measurement signals is performed by using the reproducing head; and the measuring the predetermined parameter is performed based on a result of the reading the measurement signals.

* * * * *